United States Patent
Hou

(10) Patent No.: US 9,710,960 B2
(45) Date of Patent: Jul. 18, 2017

(54) CLOSED-FORM 3D MODEL GENERATION OF NON-RIGID COMPLEX OBJECTS FROM INCOMPLETE AND NOISY SCANS

(71) Applicant: VanGogh Imaging, Inc., McLean, VA (US)

(72) Inventor: Xin Hou, Herndon, VA (US)

(73) Assignee: VanGogh Imaging, Inc., McLean, VA (US)

(*) Notice: Subject to any disclaimer, the term of this patent is extended or adjusted under 35 U.S.C. 154(b) by 43 days.

(21) Appl. No.: 14/954,775

(22) Filed: Nov. 30, 2015

(65) Prior Publication Data

US 2016/0163104 A1 Jun. 9, 2016

Related U.S. Application Data

(60) Provisional application No. 62/087,696, filed on Dec. 4, 2014.

(51) Int. Cl.
*G06T 5/00* (2006.01)
*G06T 17/00* (2006.01)
*G06T 7/33* (2017.01)

(52) U.S. Cl.
CPC .............. *G06T 17/00* (2013.01); *G06T 5/005* (2013.01); *G06T 7/344* (2017.01); *G06T 2200/04* (2013.01)

(58) Field of Classification Search
None
See application file for complete search history.

(56) References Cited

U.S. PATENT DOCUMENTS

| 6,259,815 | B1 | 7/2001 | Anderson et al. |
| 6,525,722 | B1 | 2/2003 | Deering |
| 6,525,725 | B1 | 2/2003 | Deering |
| 7,248,257 | B2 | 7/2007 | Elber |
| 7,420,555 | B1 | 9/2008 | Lee |
| 8,766,979 | B2 | 7/2014 | Lee et al. |

(Continued)

FOREIGN PATENT DOCUMENTS

| KR | 10-1054736 B1 | 8/2011 |
| KR | 10-2011-0116671 A | 10/2011 |

OTHER PUBLICATIONS

Rossignac, J. et al., "3D Compression Made Simple: Edgebreaker on a Corner-Table," Invited lecture at the Shape Modeling International Conference, Genoa, Italy (Jan. 30, 2001), pp. 1-6.

(Continued)

*Primary Examiner* — Delomia L Gilliard
(74) *Attorney, Agent, or Firm* — Proskauer Rose LLP

(57) ABSTRACT

Described herein are methods and systems for closed-form 3D model generation of non-rigid complex objects from incomplete and noisy scans. An image processing module receives a scan of a non-rigid complex object captured by a sensor, a 3D model corresponding to the object, and a camera trace, where the scan includes one or more holes. The module cleans the scan and the 3D model using the camera trace. The module deforms the cleaned 3D model to the cleaned scan and matches the deformed 3D model to the cleaned scan. The module determines one or more portions of the deformed 3D model that are unmatched and deforms the unmatched portions of the deformed 3D model to the scan using the matched portions of the deformed 3D model to generate a closed-form 3D model that closes the holes in the scan.

23 Claims, 27 Drawing Sheets

(56) References Cited

U.S. PATENT DOCUMENTS

| | | | |
|---|---|---|---|
| 8,995,756 | B2 | 3/2015 | Lee et al. |
| 2005/0068317 | A1 | 3/2005 | Amakai |
| 2005/0253924 | A1 | 11/2005 | Mashitani |
| 2007/0075997 | A1 | 4/2007 | Rohaly et al. |
| 2010/0209013 | A1 | 8/2010 | Minear et al. |
| 2010/0310154 | A1 | 12/2010 | Barrois et al. |
| 2011/0074929 | A1* | 3/2011 | Hebert ............... G01B 11/245 348/47 |
| 2011/0184695 | A1 | 7/2011 | Grzesiak |
| 2011/0310125 | A1 | 12/2011 | McEldowney et al. |
| 2012/0056800 | A1 | 3/2012 | Williams et al. |
| 2012/0063672 | A1 | 3/2012 | Gordon et al. |
| 2012/0130762 | A1* | 5/2012 | Gale ............... G01C 21/20 705/7.13 |
| 2012/0194516 | A1 | 8/2012 | Newcombe et al. |
| 2013/0069940 | A1 | 3/2013 | Sun et al. |
| 2013/0123801 | A1 | 5/2013 | Umasuthan et al. |
| 2013/0208955 | A1* | 8/2013 | Zhao ............... G06F 19/321 382/128 |
| 2014/0139639 | A1 | 5/2014 | Wagner et al. |
| 2014/0160115 | A1 | 6/2014 | Keitler et al. |
| 2014/0206443 | A1 | 7/2014 | Sharp et al. |
| 2014/0241617 | A1 | 8/2014 | Shotton et al. |
| 2014/0267264 | A1 | 9/2014 | Crassin et al. |
| 2014/0267776 | A1 | 9/2014 | Duthu |
| 2014/0321702 | A1 | 10/2014 | Schmalstieg |
| 2015/0009214 | A1* | 1/2015 | Lee ............... G06T 17/10 345/420 |
| 2015/0262405 | A1* | 9/2015 | Black ............... G06T 17/00 345/420 |
| 2015/0279118 | A1* | 10/2015 | Dou ............... G06T 15/04 345/427 |
| 2015/0356727 | A1 | 12/2015 | Urano et al. |
| 2015/0371440 | A1 | 12/2015 | Pirchheim et al. |
| 2016/0358382 | A1* | 12/2016 | Lee ............... H04N 13/0246 |
| 2017/0053447 | A1 | 2/2017 | Chen et al. |
| 2017/0054954 | A1 | 2/2017 | Keitler et al. |

OTHER PUBLICATIONS

Melax, S., "A Simple, Fast, and Effective Polygon Reduction Algorithm," Game Developer, Nov. 1998, pp. 44-49.

Myronenko, A. et al., "Point Set Registration: Coherent Point Drift," IEEE Transactions on Pattern Analysis and Machine Intelligence, vol. 32, No. 12, Dec. 2010, pp. 2262-2275.

Bookstein, F., "Principal Warps: Thin-Plate Splines and the Decomposition of Deformations," IEEE Transactions on Pattern Analysis and Machine Intelligence, vol. 11, No. 6, Jun. 1989, pp. 567-585.

Izadi, S. et al., "KinectFusion: Real-time 3D Reconstruction and Interaction Using a Moving Depth Camera," UIST '11, Oct. 16-19, 2011, 10 pages.

Papazov, C. et al., "An Efficient RANSAC for 3D Object Recognition in Noisy and Occluded Scenes," presented at Computer Vision—ACCV 2010—10th Asian Conference on Computer Vision, Queenstown, New Zealand, Nov. 8-12, 2010, 14 pages.

Biegelbauer, Georg et al., "Model-based 3D object detection—Efficient approach using superquadrics," Machine Vision and Applications, Jun. 2010, vol. 21, Issue 4, pp. 497-516.

Kanezaki, Asako et al., "High-speed 3D Object Recognition Using Additive Features in a Linear Subspace," 2010 IEEE International Conference on Robotics and Automation, Anchorage Convention District, May 3-8, 2010, pp. 3128-3134.

International Search Report and Written Opinion from International PCT patent application No. PCT/US14/045591, dated Nov. 5, 2014, 9 pages.

International Search Report and Written Opinion from International PCT patent application No. PCT/US13/062292, dated Jan. 28, 2014, 10 pages.

Sumner, R. et al., "Embedded Deformation for Shape Manipulation," Applied Geometry Group, ETH Zurich, SIGGRAPH 2007, 7 pages.

* cited by examiner

CLOSED-FORM 3D MODEL GENERATION OF NON-RIGID COMPLEX OBJECTS FROM INCOMPLETE AND NOISY SCANS

RELATED APPLICATIONS

This application claims priority to U.S. Provisional Patent Application No. 62/087,696, filed on Dec. 4, 2014, the entirety of which is incorporated herein by reference.

TECHNICAL FIELD

The subject matter of this application relates generally to methods and apparatuses, including computer program products, for closed-form 3D model generation of non-rigid complex objects from incomplete and noisy scans—including registering a source image of an object (reference generic model) with a target image (input scan) of the object with the output of a fully deformed model primarily used in three-dimensional (3D) computer vision object detection.

BACKGROUND

Many new software applications, including those developed for mobile device platforms, use 3D computer vision processing to enhance their features, functionality, and user experience. One example of such vision processing is the detection of objects in three-dimensional space. Compared to traditional color image-based methods, 3D object detection techniques are more robust and more accurate. Specifically, 3D object detection techniques depend on the object's color and lighting of the scene, attributes which can cause unexpected problems for color image-based methods. Most importantly, 3D object detection methods provide the advantage of obtaining object orientation.

Unfortunately, traditional 3D object technology is time consuming and difficult to implement in the real world. The problem is that once the scans are captured and registered via Simultaneous Localization and Mapping (SLAM) (or Fusion) to create a model, the resulting 3D model is usually not closed (e.g., has holes or gaps) or noisy (e.g., not smooth with irregular surfaces). Hence, these scans are manually further processed using a CAD tool to create a fully closed and smooth 3D model which can then be 3D printed or used in animation.

SUMMARY

Therefore, what is needed are methods and systems for providing a lightweight, robust 3D computer vision processing toolkit that outputs a fully formed, closed 3D model even when the input scan is noisy or has holes or gaps. The methods and systems described herein also provide the advantage of allowing 3D computer vision applications to interact with the real world, allowing the creation of a 3D model from noisy and partial input scans of non-rigid, complex objects. Such methods and systems are available by implementing the shape-based registration module in Starry Night plug-in for the Unity 3D game engine, available from VanGogh Imaging, Inc. of McLean, Va. In addition, shape-based recognition techniques to be used in conjunction with the present technology are described in U.S. patent application Ser. No. 14/324,891, titled "Real-Time 3D Computer Vision Processing Engine for Object Recognition, Reconstruction, and Analysis", which is incorporated by reference herein in its entirety.

The invention, in one aspect, features a computerized method for closed-form 3D model generation of non-rigid complex objects from incomplete and noisy scans. An image processing module of a computing device receives a scan of a non-rigid complex object captured by a sensor coupled to the computing device, a 3D model corresponding to the object, and a camera trace, where the scan includes one or more holes. The image processing module cleans the scan and the 3D model using the camera trace. The image processing module deforms the cleaned 3D model to the cleaned scan. The image processing module matches the deformed 3D model to the cleaned scan. The image processing module determines one or more portions of the deformed 3D model that are unmatched. The image processing module deforms the unmatched portions of the deformed 3D model to the scan using the matched portions of the deformed 3D model to generate a closed-form 3D model that closes the holes in the scan.

The invention, in another aspect, features a system for closed-form 3D model generation of non-rigid complex objects from incomplete and noisy scans. The system comprises an image processing module of a computing device. The image processing module receives a scan of a non-rigid complex object captured by a sensor coupled to the computing device, a 3D model corresponding to the object, and a camera trace, where the scan includes one or more holes. The image processing module cleans the scan and the 3D model using the camera trace. The image processing module deforms the cleaned 3D model to the cleaned scan. The image processing module matches the deformed 3D model to the cleaned scan. The image processing module determines one or more portions of the deformed 3D model that are unmatched. The image processing module deforms the unmatched portions of the deformed 3D model to the scan using the matched portions of the deformed 3D model to generate a closed-form 3D model that closes the holes in the scan.

The invention, in another aspect, features a computer program product, tangibly embodied in a non-transitory computer readable storage medium, for closed-form 3D model generation of non-rigid complex objects from incomplete and noisy scans. The computer program product includes instructions operable to cause an image processing module of a computing device to receive a scan of a non-rigid complex object captured by a sensor coupled to the computing device, a 3D model corresponding to the object, and a camera trace, where the scan includes one or more holes. The computer program product includes instructions operable to cause the image processing module to clean the scan and the 3D model using the camera trace. The computer program product includes instructions operable to cause the image processing module to deform the cleaned 3D model to the cleaned scan. The computer program product includes instructions operable to cause the image processing module to match the deformed 3D model to the cleaned scan. The computer program product includes instructions operable to cause the image processing module to determine one or more portions of the deformed 3D model that are unmatched. The computer program product includes instructions operable to cause the image processing module to deform the unmatched portions of the deformed 3D model to the scan using the matched portions of the deformed 3D model to generate a closed-form 3D model that closes the holes in the scan.

Any of the above aspects can include one or more of the following features. In some embodiments, cleaning the scan and the 3D model comprises projecting one of the 3D model or the scan to a rough camera plane at a plurality of angles, recording points in 3D model or the scan with a smallest depth value at each of the plurality of angles, and projecting the 3D model or the scan to the rough camera plane. In some embodiments, matching the 3D model and the scan comprises deforming the cleaned 3D model to at least partially match the cleaned scan by creating holes in the cleaned 3D model that are similar to the holes in the cleaned scan and deforming the holes in the cleaned 3D model based upon the deforming the cleaned 3D model step. In some embodiments, deforming the cleaned 3D model is performed using a coherent point drifting algorithm. In some embodiments, deforming the holes in the cleaned 3D model is performed using a thin-plate spline algorithm. In some embodiments, the cleaned 3D model and the cleaned scan are down-sampled before deforming the cleaned 3D model.

In some embodiments, matching the deformed 3D model to the scan comprises finding one or more neighbor points in the deformed 3D model for each point in the deformed 3D model, calculating an average distance between each point and the corresponding neighbor points, finding one or more neighbor points in the cleaned scan for each point in the deformed 3D model, finding one or more of the neighbor points that are located inside a cylinder region whose center is the point in the deformed 3D model, whose axis is a normal of the point in the deformed 3D model, and whose radius is the average distance, averaging the one or more of the neighbor points located inside the cylinder region, and moving each point in the deformed 3D model to the averaged neighbor points.

In some embodiments, deforming the unmatched portions of the deformed 3D model to the scan using the matched portions of the deformed 3D model comprises finding, for each unmatched point in the deformed 3D model, one or more neighbor points in the deformed 3D model for which there are matched points in the scan within a predetermined range, finding one or more other unmatched points within the predetermined range, and deforming the one or more other unmatched points based upon the matched points. In some embodiments, the unmatched points are deformed using a thin-plate spline algorithm.

In some embodiments, matching the deformed 3D model to the cleaned scan further comprises uniformly down-sampling points of the deformed 3D model, building a deformation graph based upon the down-sampled points, where the deformation graph comprises a list of deformation nodes having a 3D position, a list of neighbor deformation nodes, and a 3D affine matrix and a 3D translation vector for deformation, deforming the deformation graph using an embedded deformation for shape manipulation technique and deforming the deformed 3D model based upon the deformation graph. In some embodiments, building a deformation graph comprises representing each down-sampled point by a deformation node, initializing the 3D position of the deformation node as a 3D position of the down-sampled point, searching neighboring deformation nodes within a predetermined distance, and initializing the 3D affine matrix of as an identity matrix and the translation vector as a zero vector.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

The methods and systems described herein provide the process of creating a fully formed, closed 3D model from scans captured using 3D depth sensors that allows easy-to-use 3D computer vision processing software applications to interact with the real world. Generally, shape-based registration is very tolerant of noisy or partial input scans. As a result, application builders can use the shape-based registration functions to create a fully-closed and smooth 3D model without the need for further manual processing.

In some embodiments, the methods and systems can provide individual scans of the scene using a 3D scanner. A Simultaneous Localization and Mapping (SLAM) model captures the scene in 3D. An Object Recognition function is performed real-time by examining the captured scene and looking for an object based on a reference model. Once the object is recognized, a Shaped-Based Registration process provides registering a source image (e.g., a reference generic model) with a target image (e.g., an input scan) of the object. Shape-based registration deforms the reference model to match the scan points of the input resulting in the output of a fully-formed 3D model.

In some embodiments, the methods and systems integrate with multiple operating system platforms (e.g., those supported by the Unity 3D Game Engine available from Unity Technologies of San Francisco, Calif.), such as the Android mobile device operating system. Further, some embodiments of the methods and systems described herein are designed to take advantage of hardware acceleration techniques, such as using a field programmable gate array (FPGA), a graphics processing unit (GPU), and/or a digital signal processor (DSP).

Exemplary techniques provided by the methods and systems described herein include Simultaneous Localization and Mapping (SLAM) functions, which are used for 3D reconstruction, augmented reality, robot controls, and many other applications. Other exemplary techniques include object recognition capability for any type of 3D object. The SLAM and object recognition capabilities can be enhanced to include analysis tools for measurements and feature extraction. In some embodiments, the systems and methods described herein interface to any type of 3D sensor or stereo camera (e.g., a Carmine 3D Sensor available from PrimeSense of Tel Aviv, Israel).

Figure 1:
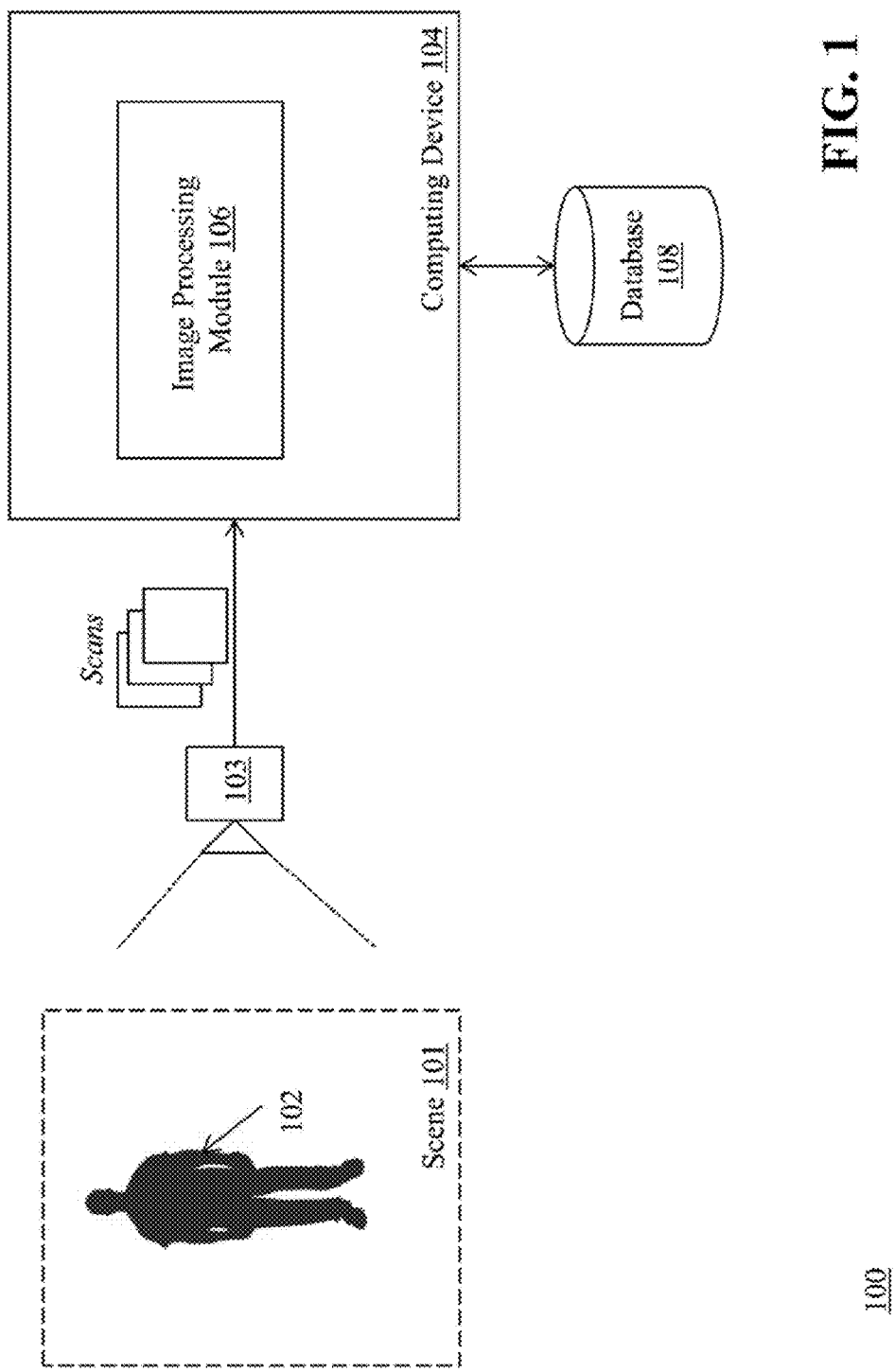
FIG. 1 is a block diagram of a system for closed-form 3D model generation of non-rigid complex objects from incomplete and noisy scans.

FIG. 1 is a block diagram of a system 100 for closed-form 3D model generation of non-rigid complex objects from incomplete and noisy scans. The system includes a sensor 103 coupled to a computing device 104. The computing device 104 includes an image processing module 106. The computing device is also coupled to a database 108.

The sensor 103 is positioned to capture images of a scene 101 which includes one or more non-rigid objects (e.g., object 102). Exemplary sensors that can be used in the system 100 include, but are not limited to, 3D scanners, digital cameras, and other types of devices that are capable of capturing images of a real-world object and/or scene to collect data on its position, location, and appearance. In some embodiments, the sensor 103 is embedded into the computing device 104, such as a camera in a smartphone, for example.

The computing device 104 receives scans (or images) of the scene 101 from the sensor 103 and processes the images to generate 3D models of the objects (e.g., object 102) represented in the scene 101. The computing device 104 can take on many forms, including both mobile and non-mobile forms. Exemplary computing devices include, but are not limited to, a laptop computer, a desktop computer, a tablet computer, a smart phone, an internet appliance, or the like. It should be appreciated that other computing devices (e.g., an embedded system) can be used without departing from the scope of the invention. The mobile computing device 102 includes network-interface components to connect to a communications network. In some embodiments, the network-interface components include components to connect to a wireless network, such as a Wi-Fi or cellular network, in order to access a wider network, such as the Internet.

The computing device 104 includes an image processing module 106 configured to receive images captured by the sensor 103 and analyze the images in a variety of ways, including detecting the position and location of objects represented in the images and generating 3D models of objects in the images. The image processing module 106 is a hardware and/or software module that resides on the computing device 106 to perform functions associated with analyzing images capture by the scanner, including the generation of 3D models based upon objects in the images. In some embodiments, the functionality of the image processing module 106 is distributed among a plurality of computing devices. In some embodiments, the image processing module 106 operates in conjunction with other modules that are either also located on the computing device 104 or on other computing devices coupled to the computing device 104. An exemplary image processing module is the Starry Night plug-in for the Unity 3D engine or other similar libraries, available from VanGogh Imaging, Inc. of McLean, Va. It should be appreciated that any number of computing devices, arranged in a variety of architectures, resources, and configurations (e.g., cluster computing, virtual computing, cloud computing) can be used without departing from the scope of the invention.

The database 108 is coupled to the computing device 104, and operates to store data used by the image processing module 106 during its image analysis functions. The database 108 can be integrated with the server computing device 106 or be located on a separate computing device. An example database that can be used with the system 100 is MySQL™ available from Oracle Corp. of Redwood City, Calif.

Figure 2:
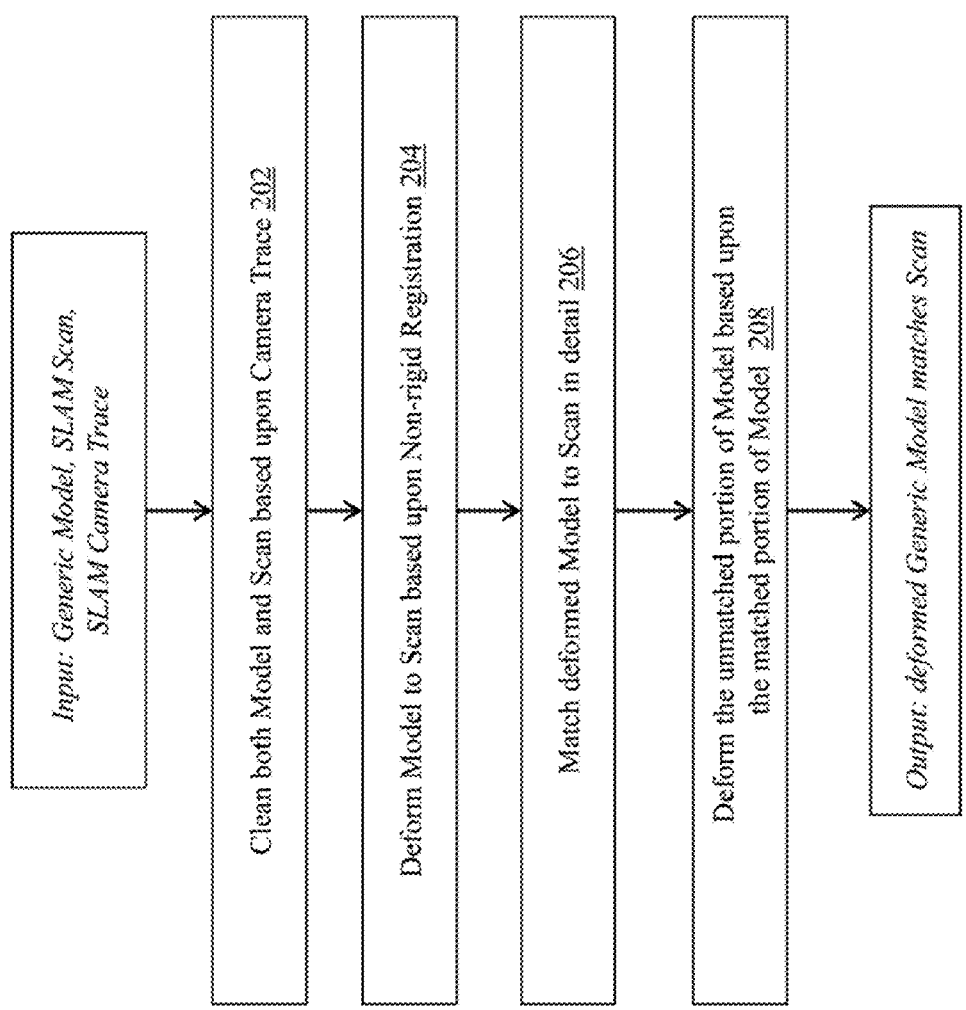
FIG. 2 is a flow diagram of a method for closed-form 3D model generation of non-rigid complex objects from incomplete and noisy scans.

FIG. 2 is a flow diagram of a method 200 for closed-form 3D model generation of non-rigid complex objects from incomplete and noisy scans. An example of a non-rigid complex object can be a human. It should be understood that other types of non-rigid, complex objects can be scanned, and the scans analyzed and registered, using the same techniques. The flow diagram shows the steps of achieving a match between a generic reference model and an input scan, which results in an output of a deformed generic model. The method will be described in greater detail in the following sections.

Figure 3A:
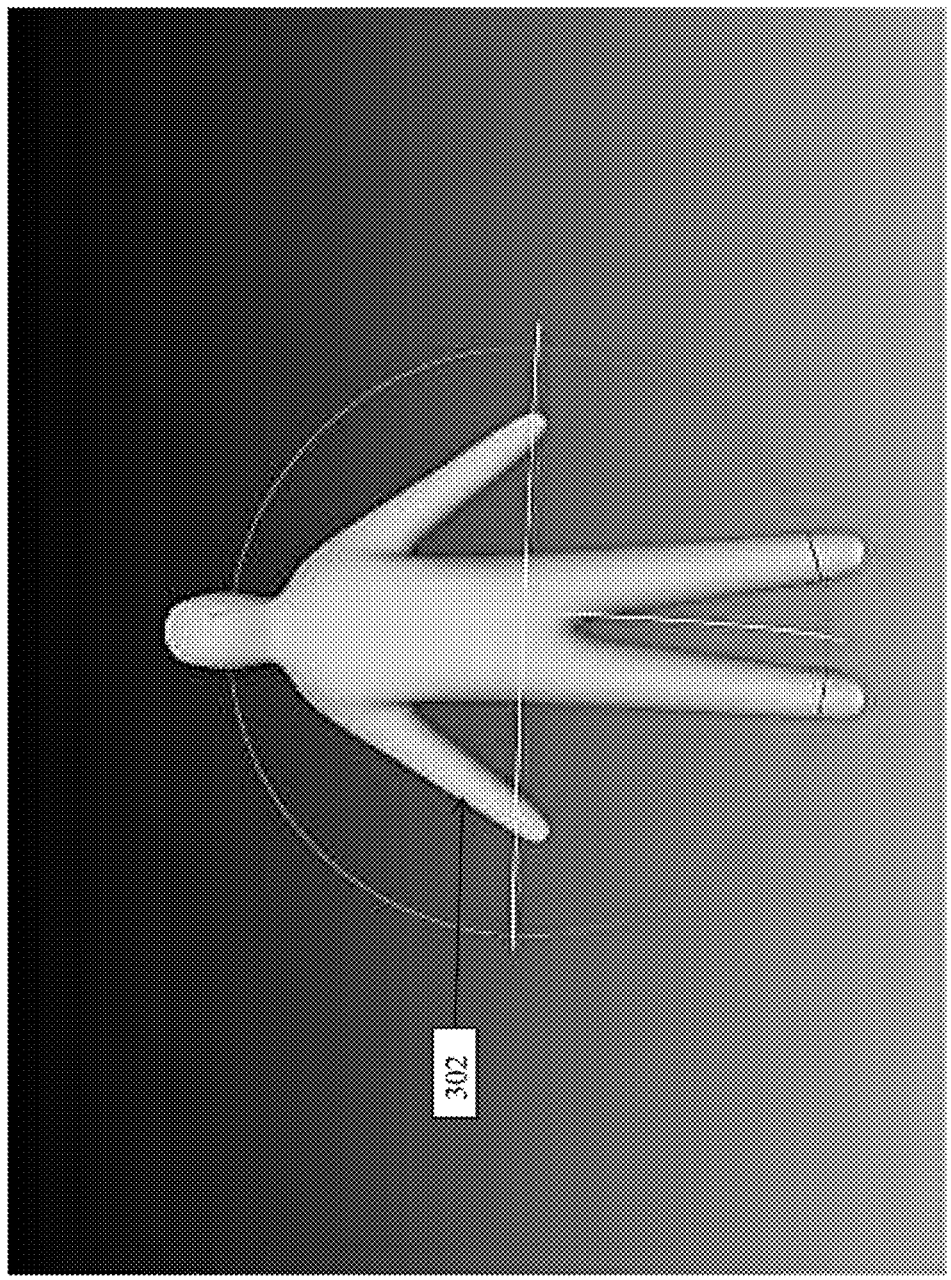
FIG. 3A shows a Generic Model used in the Input step of the method of FIG. 2.
Figure 3B:
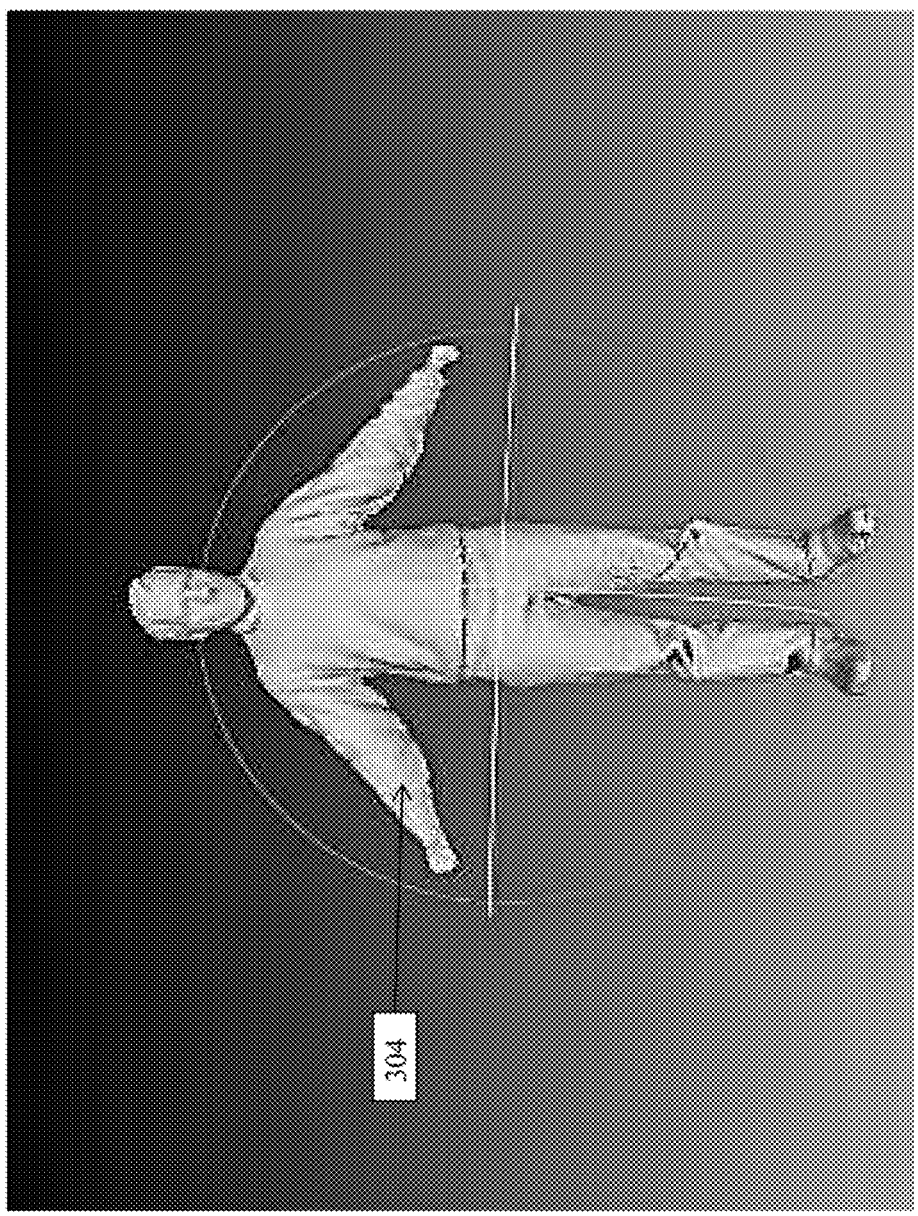
FIG. 3B shows a SLAM Scan used in the Input step of the method of FIG. 2.
Figure 3C:
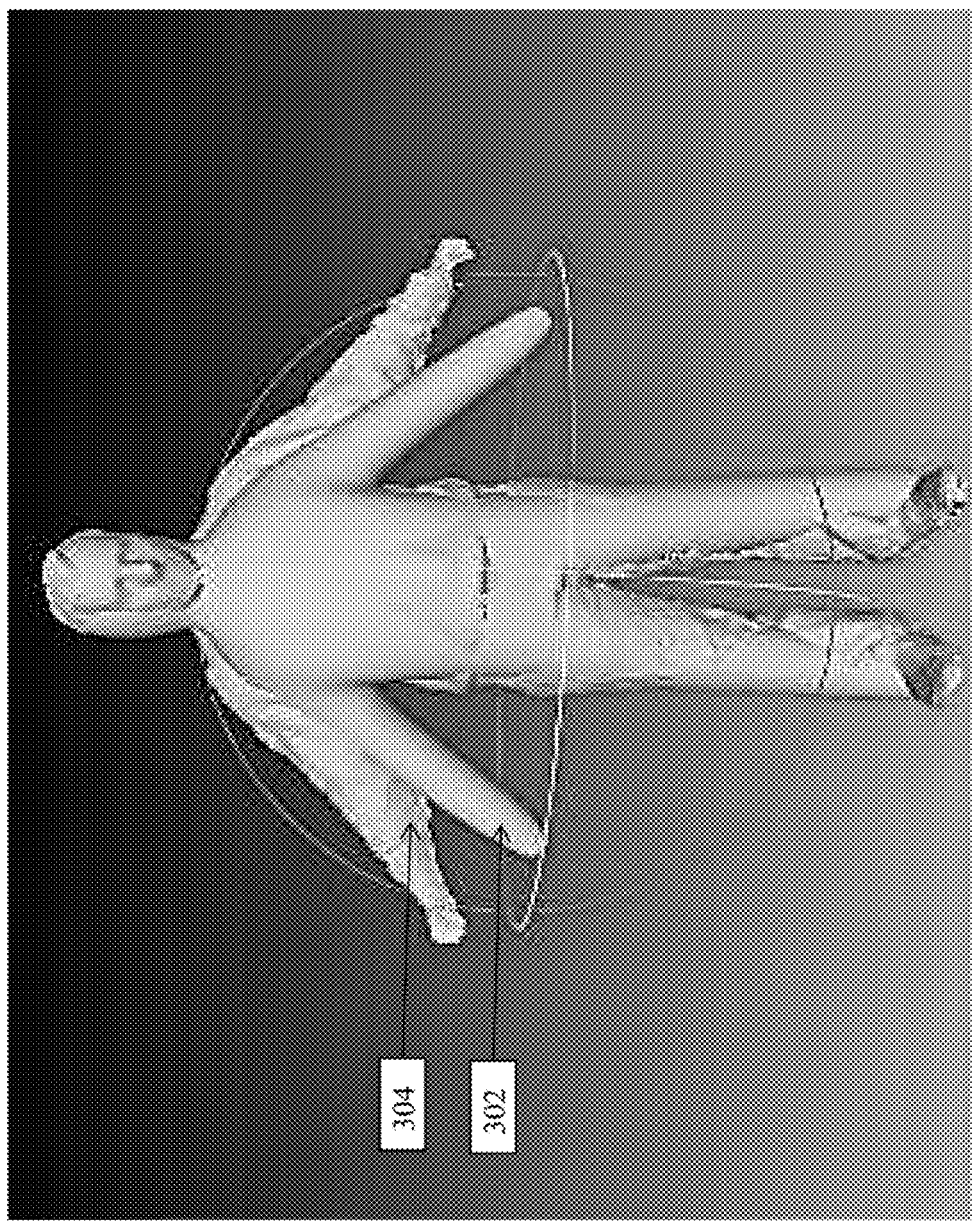
FIG. 3C shows a rough match of the Generic Model and the SLAM Scan used in the Input step of the method of FIG. 2.

FIG. 3A shows a Generic Model 302 used in the Input step of the method of FIG. 2, FIG. 3B shows a SLAM Scan 304 used in the Input step of the method of FIG. 2, and FIG. 3C shows a rough match of the Generic Model 302 and the SLAM Scan 304 used in the Input step of the method of FIG. 2. As shown in FIG. 3C, the Generic Model 302 is roughly matched to the SLAM Scan 304 in position and scale.

Figure 4A:
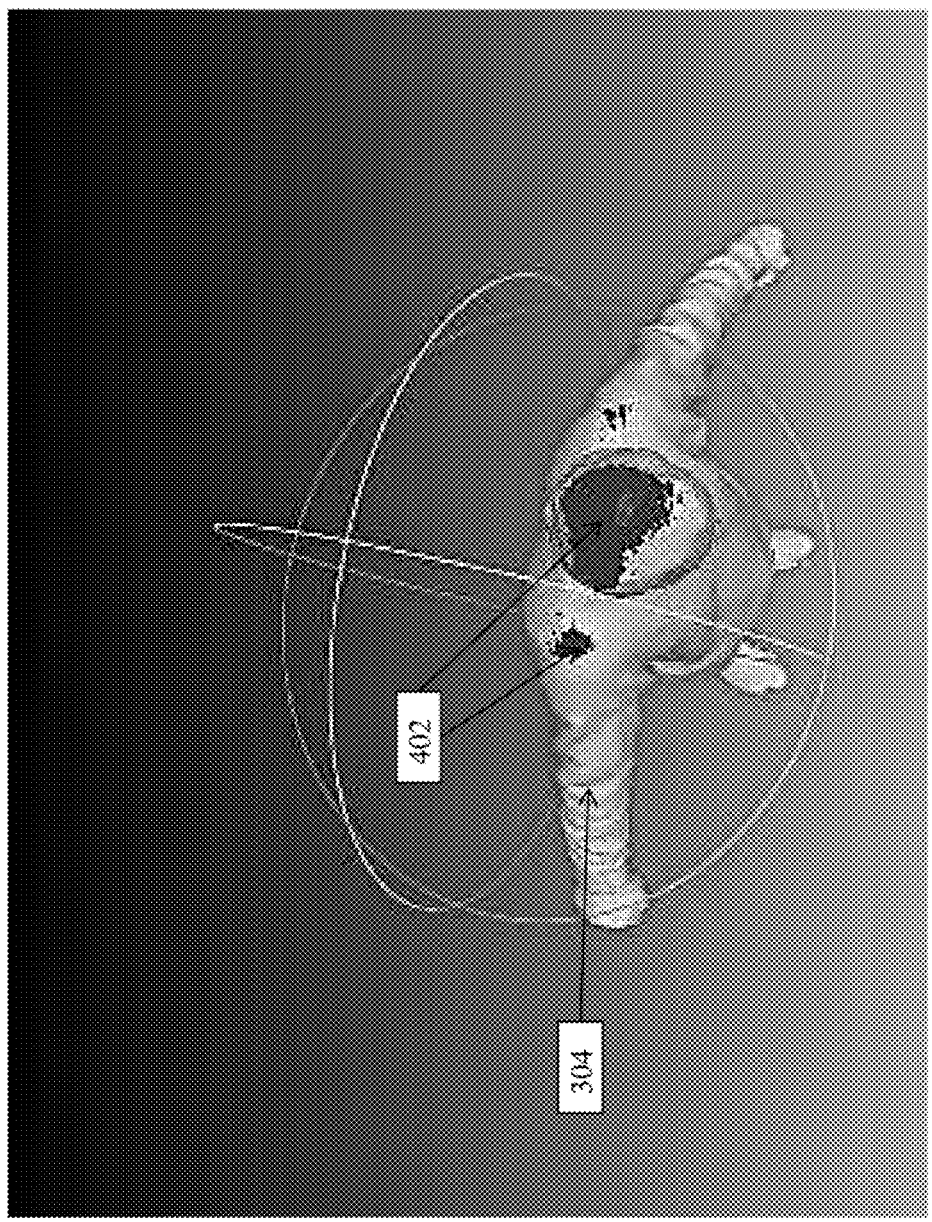
FIG. 4A shows the input SLAM Scan from a top-down angle.
Figure 4B:
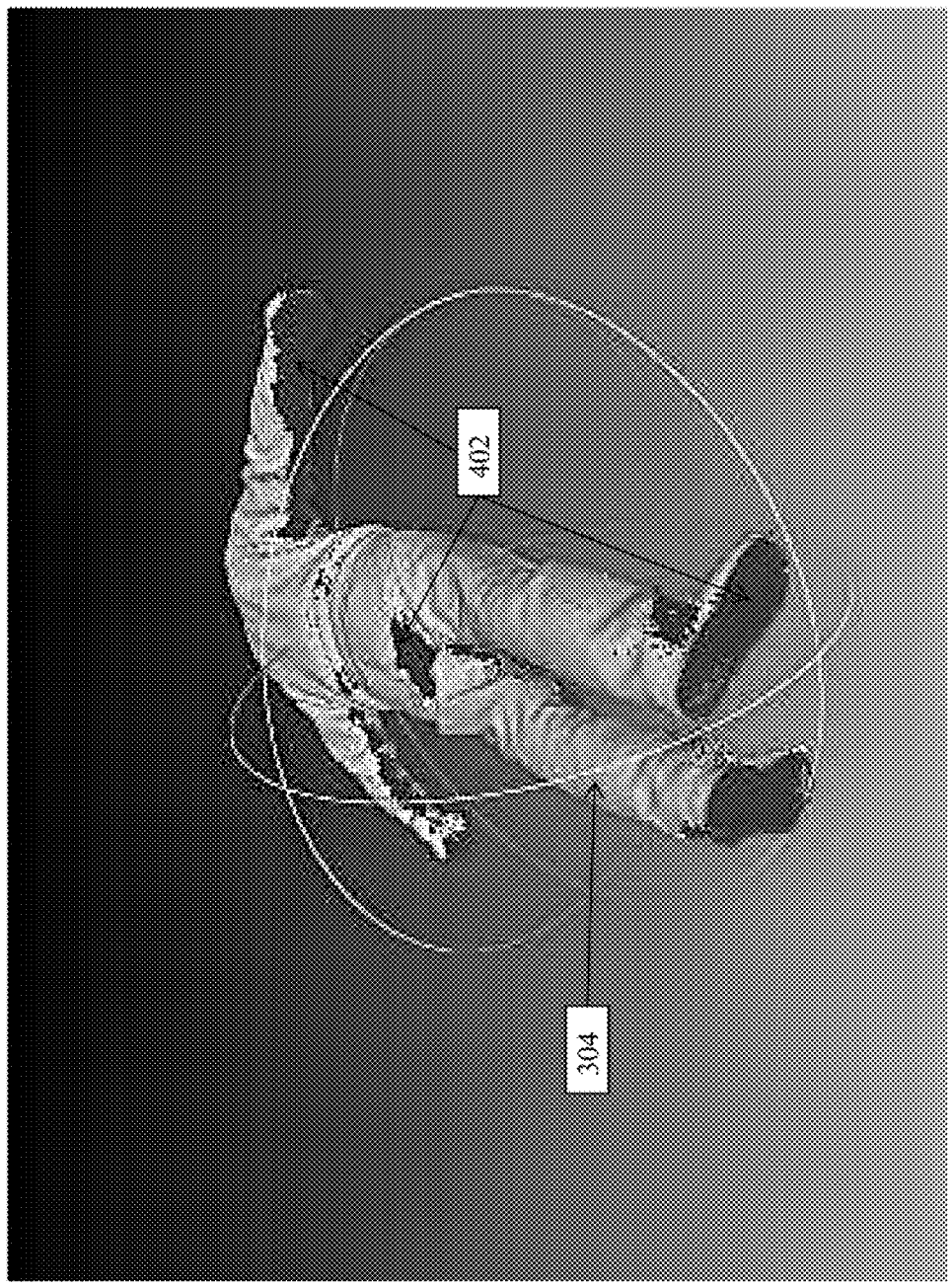
FIG. 4B shows the input SLAM Scan from a bottom rear-facing angle.
Figure 4C:
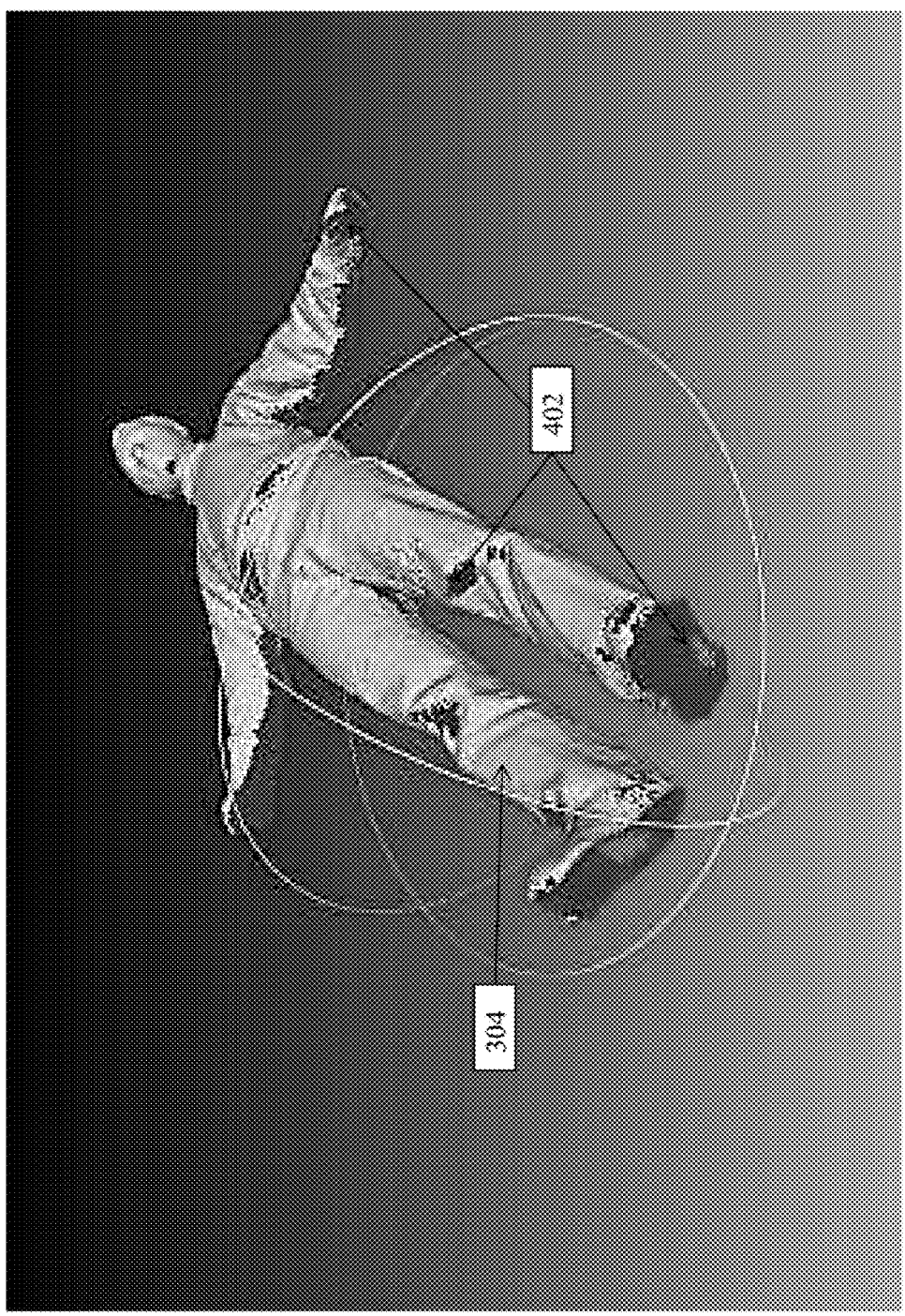
FIG. 4C shows the input SLAM Scan from a bottom front-facing angle.

FIG. 4A shows the input SLAM Scan 304 from a top-down angle. FIG. 4B shows the input SLAM Scan 304 from a bottom rear-facing angle. FIG. 4C shows the input SLAM Scan 304 from a bottom front-facing angle. As seen in each of FIGS. 4A-4C, the SLAM Scan 304 has gaps 402 (or holes) in certain areas (e.g., top of head, bottom of feet, and bottom of arms). These gaps 402 occur, for example, because the camera captures the scan of the object from a limited number of perspectives or views (e.g., front-facing, rear-facing) and does not capture every single angle or view of the object. Therefore, to generate a robust closed-form 3D model, the image processing module 106 of the computing device 104 repairs the gaps, as will be explained below.

Figure 5A:
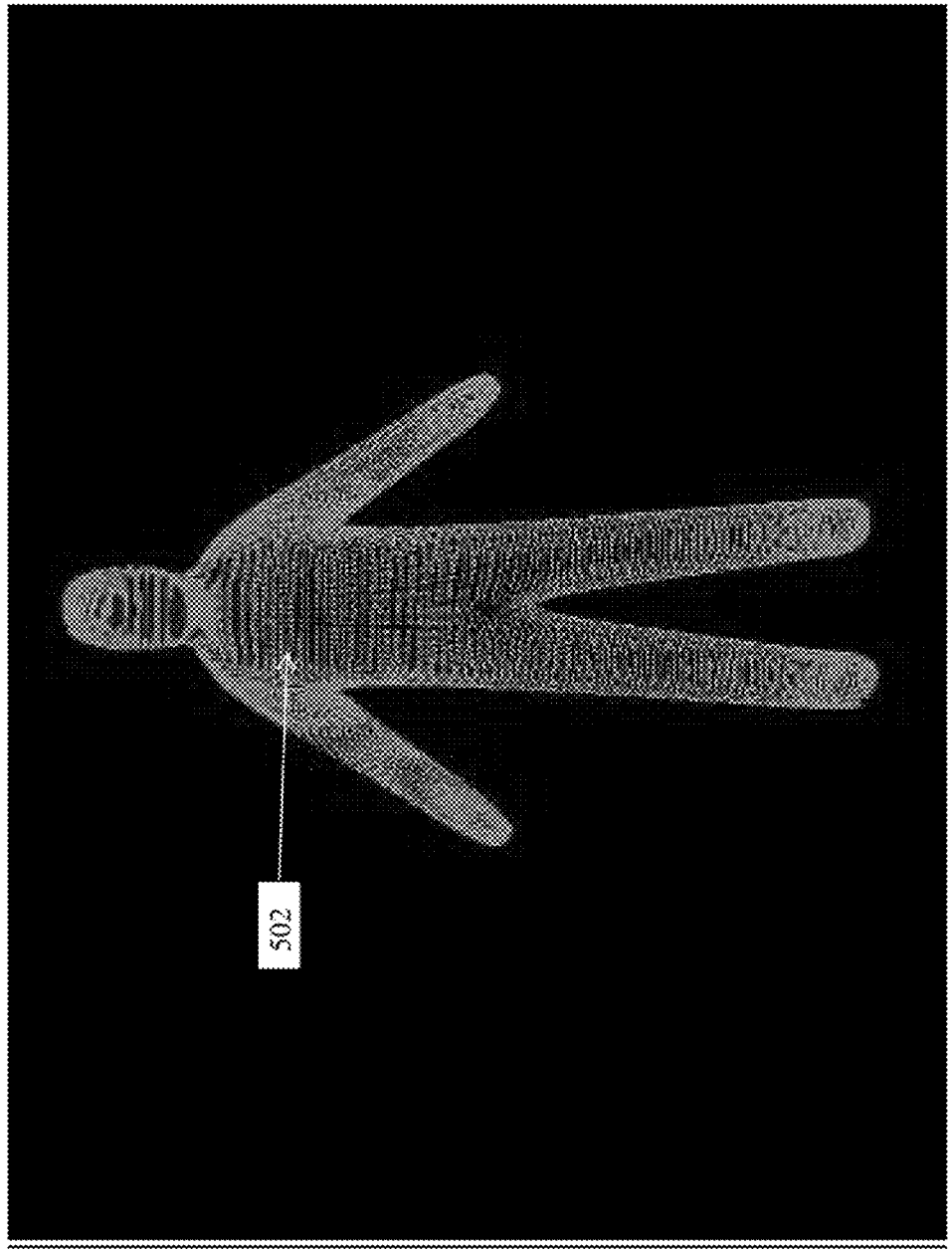
FIG. 5A shows a Cleaned Generic Model.
Figure 5B:
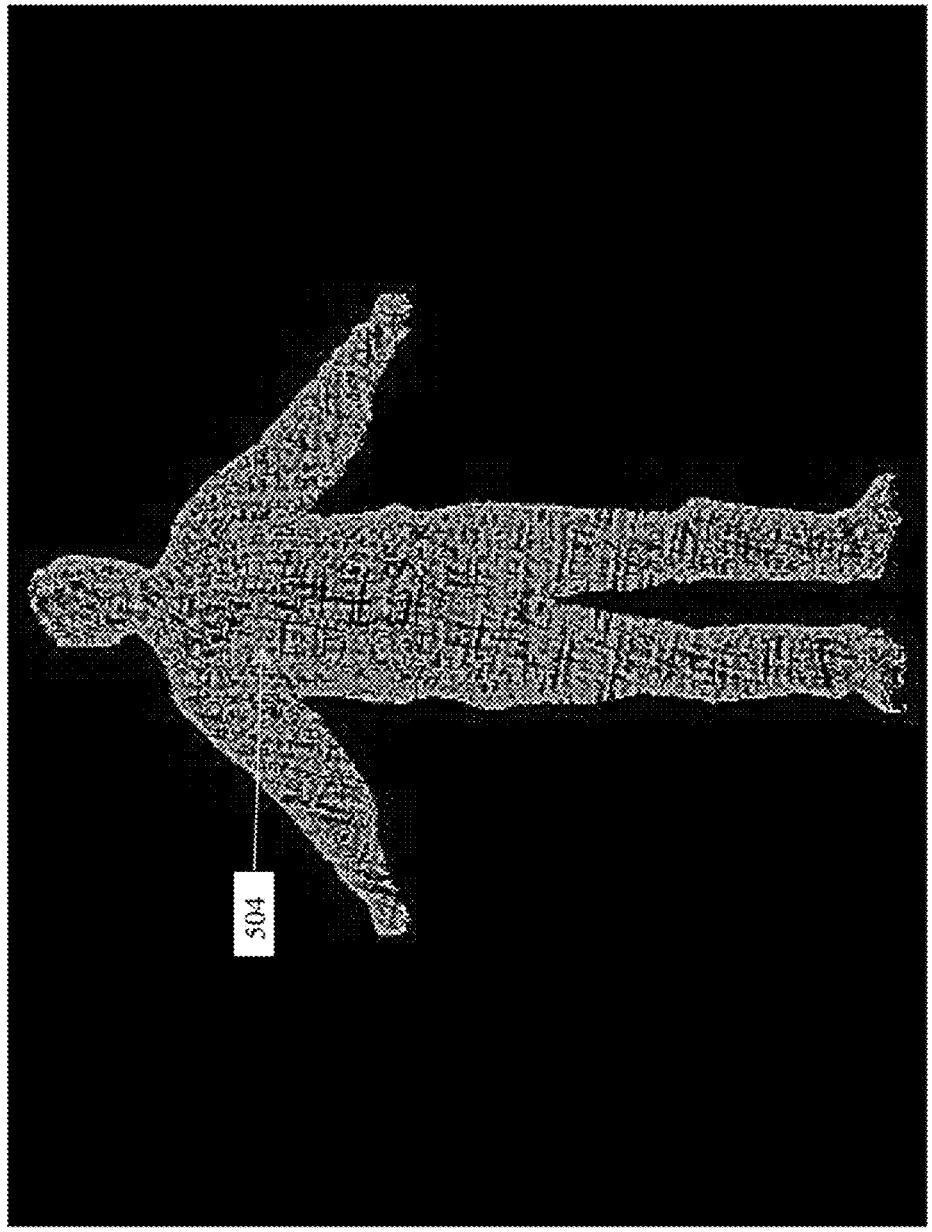
FIG. 5B shows a Cleaned SLAM Scan.

FIG. 5A shows a Cleaned Generic Model 502 and FIG. 5B shows a Cleaned SLAM Scan 504, after the image processing module 106 of the computing device 104 cleans both the input Generic Model 302 and the input SLAM Scan 304 based upon a SLAM Camera Trace. Returning to FIG. 2, once the input Generic Model, input SLAM Scan, and SLAM Camera Trace are received by the image processing module 104, the module 104 cleans (202) both the Generic Model 302 and the SLAM Scan 304 based upon the SLAM Camera Trace. Specifically, the image processing module 104 cleans both the Generic Model and the SLAM Scan by projecting the Generic Model and the SLAM Scan to a camera plane with different camera angles based upon the SLAM Camera Trace.

In Step 202 of FIG. 2, the image processing module 104 performs the following sub-steps:

1) Using different camera angles, the image processing module 104 projects the Generic Model and/or the SLAM Scan to a rough camera plane. The points in the Generic Model and/or the SLAM Scan with the smallest depth value (each 3D point has three dimensions x, y, and z, so the smallest depth value means the smallest z value) are recorded, e.g. if one of the camera angles (directions) is such that the camera points to the person's face (i.e., front of the person's head), then because the points of the face have a smaller depth (z) value than that of the points in the back of the head, points that belong to the face, instead of the back of the head, are recorded from this angle.

2) The image processing module projects the Generic Model and/or the SLAM Scan to the same camera plane and points which are far from the recorded points are ignored.

Figure 6A:
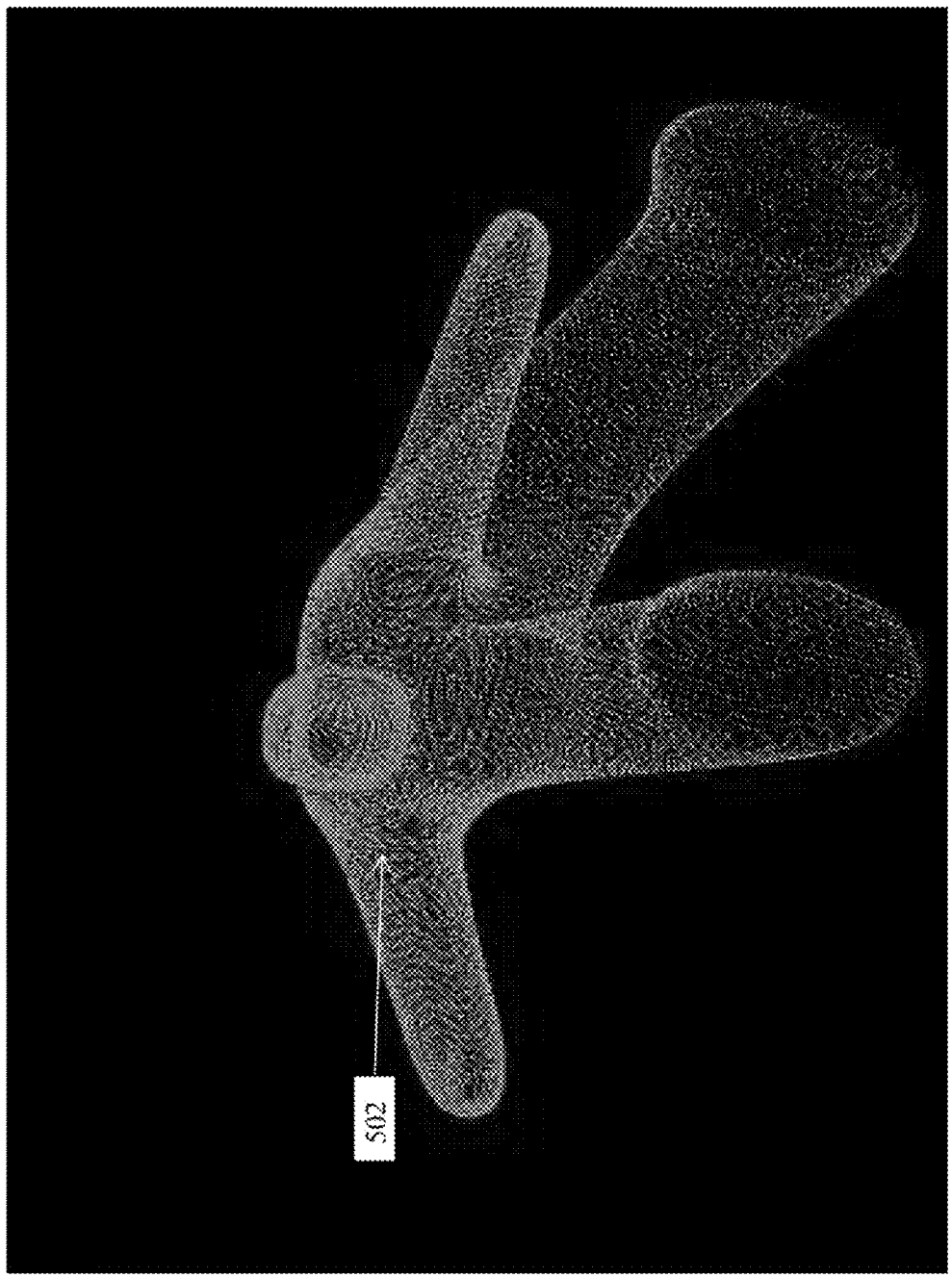
FIG. 6A shows a Cleaned Generic Model from a bottom, front-facing angle.
Figure 6B:
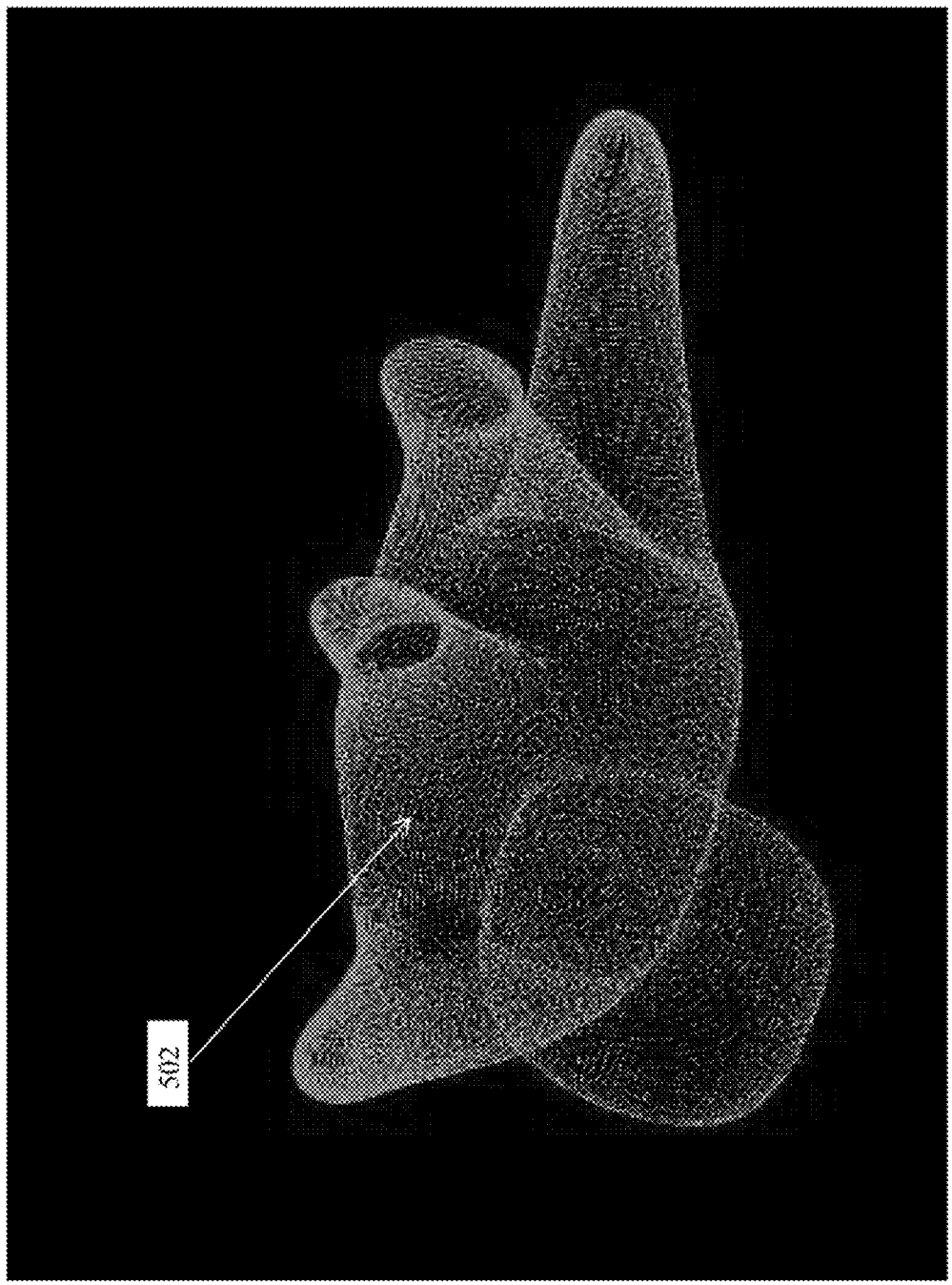
FIG. 6B shows a Cleaned Generic Model from a top-down angle.

FIG. 6A shows a Cleaned Generic Model 502 from a bottom, front-facing angle and FIG. 6B shows a Cleaned Generic Model 502 from a top-down angle, after the image processing module 104 performs the cleaning step 202 of FIG. 2.

Once the image processing module 104 completes the cleaning step 202, the module 104 deforms (204) the Cleaned Generic Model to the Cleaned SLAM Scan using non-rigid registration techniques. In an embodiment, the image processing module 104 deforms the Cleaned Generic Model to the Cleaned SLAM Scan using, e.g., a Coherent Point Drifting algorithm. An exemplary Coherent Point Drifting algorithm is described in Andriy Myronenko and Xubo Song, "Point Set Registration: Coherent Point Drift," IEEE Transactions on Pattern Analysis and Machine Intelligence, Vol. 32, No. 12, December 2010, the content of which is incorporated herein by reference.

In one example of non-rigid registration, the image processing module 104 deforms the Cleaned Generic Model to at least partially match the Cleaned SLAM Scan by creating holes or gaps in the Cleaned Generic Model that are similar to the holes or gaps in the Cleaned SLAM Scan. The non-rigid registration algorithm generates more robust and constant results, i.e., the matching result of the Cleaned Generic Model to the Cleaned SLAM Scan is better than that of the Generic Model to the SLAM Scan. Otherwise, the image processing module 104 may not be able to register the object in the scan because the object does not sufficiently match the Model—for example, the Model would not have a gap at the top of the head and the image processing module 104 would not recognize the object in the Scan as matching the Model because of this difference. Following the non-rigid registration process described above, the image processing module 104 deforms the holes or gaps present in the Generic Model based on the matching result of the Cleaned Generic Model to the Cleaned SLAM Scan by using, for example, a Thin-Plate Spline algorithm. An exemplary Thin-Plate Spline algorithm is described in Fred L. Bookstein, "Principal Warps: Thin-Plate Splines and the Decomposition of Deformations," IEEE Transactions on Pattern Analysis and Machine Intelligence, Vol. 11, No. 6, June 1989, the content of which is incorporated herein by reference. Also, for performance purposes, it may be necessary in some cases for the image processing module 104 to down-sample the Cleaned Generic Model and the Cleaned SLAM Scan before performing the non-rigid registration process.

Figure 7A:
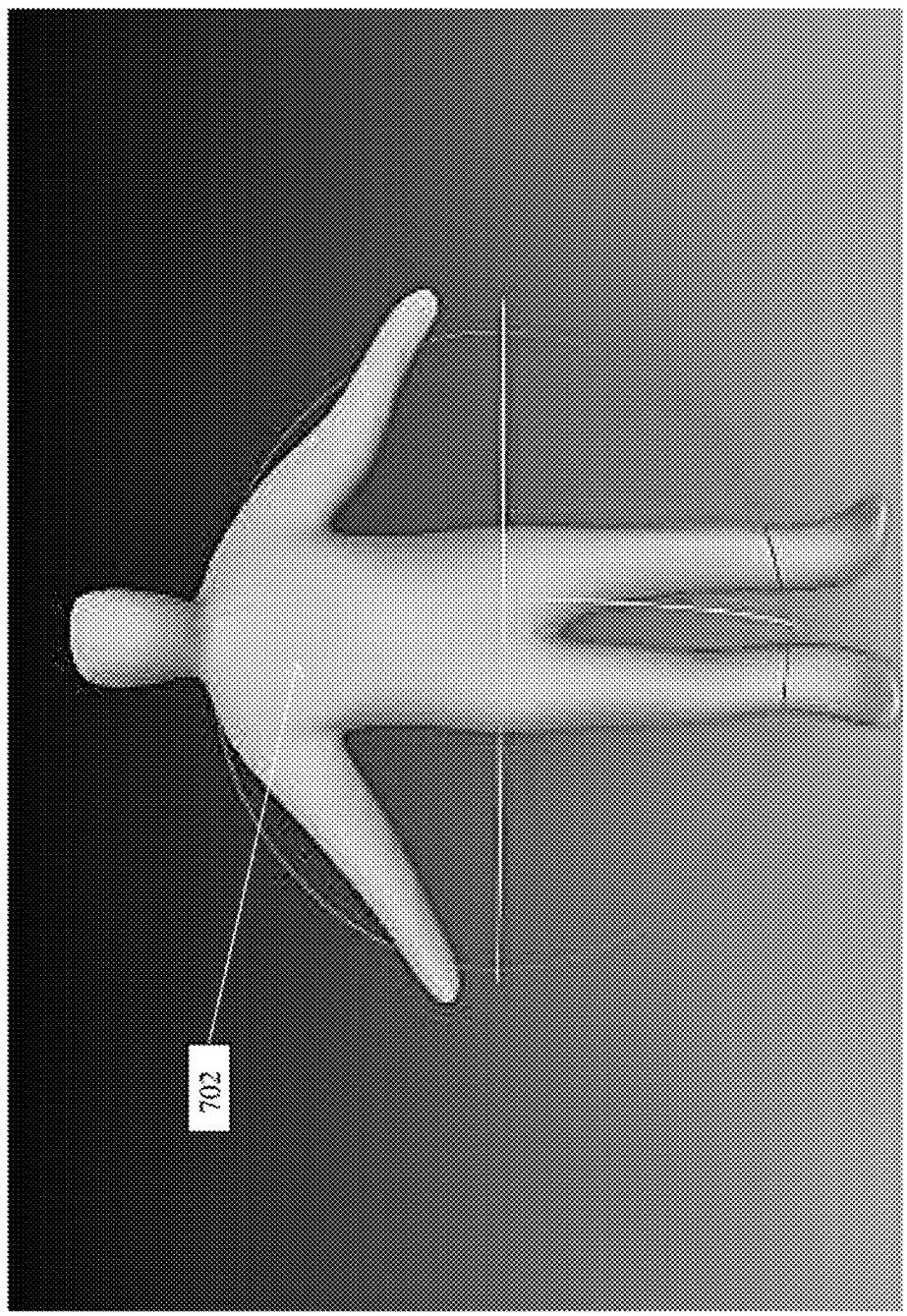
FIG. 7A shows a Deformed Generic Model.
Figure 7B:
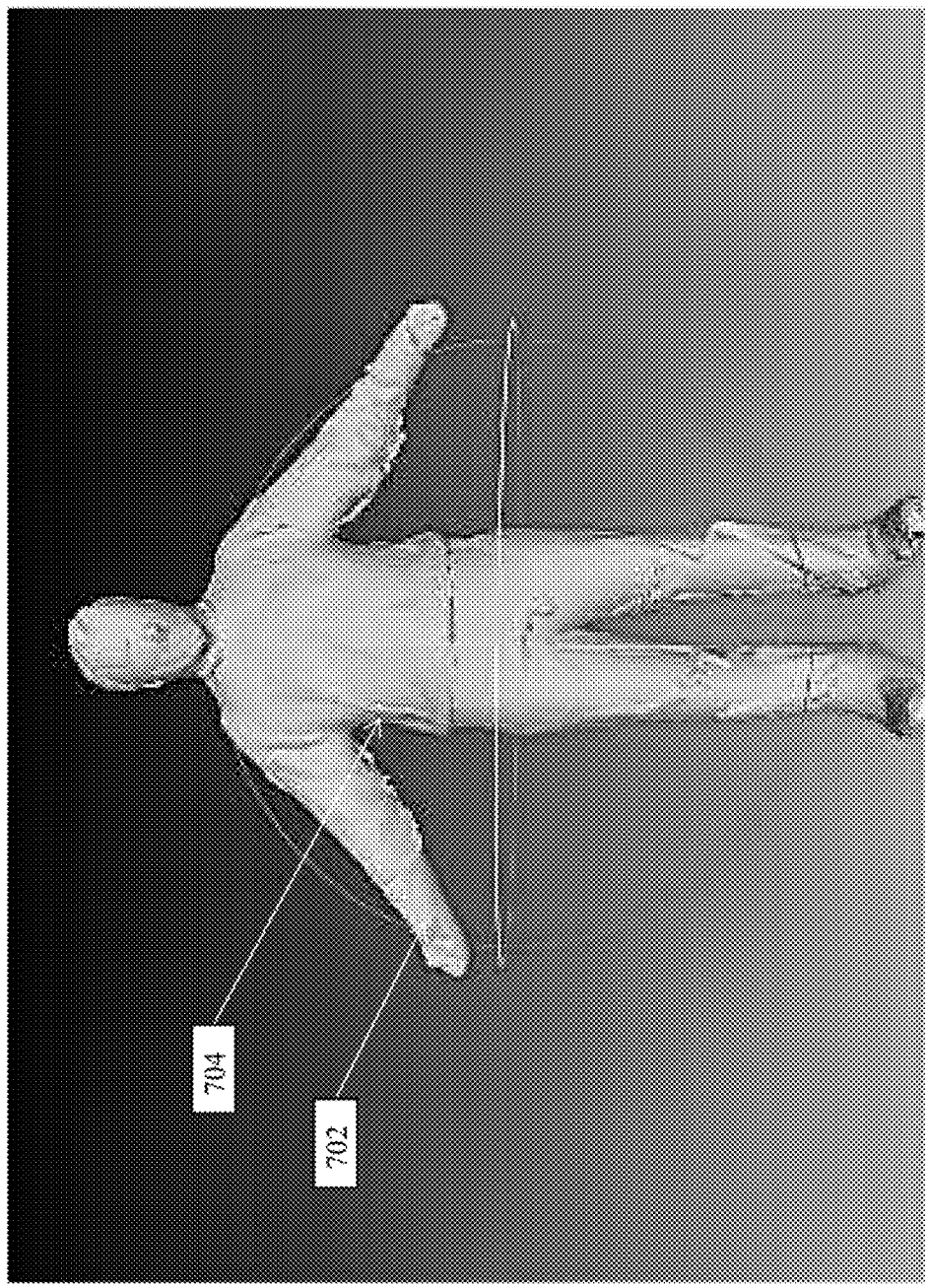
FIG. 7B shows a Deformed Generic Model matched with a SLAM Scan.

The result of the deforming step 204 is shown in FIGS. 7A and 7B. FIG. 7A shows a Deformed Generic Model 702, and FIG. 7B shows the Deformed Generic Model matched with the SLAM Scan 704.

Returning to FIG. 2, once the deforming step 204 is complete, the image processing module 104 matches (206) the Deformed Generic Model to the SLAM Scan in detail. Using the approximated matching from the deforming step 204, the image processing module 104 refines the matching result using greater detail, as provided in the following sub-steps:

1) For every point in the Deformed Generic Model, the image processing module 104 finds that point's neighbor points in the Deformed Generic Model.
2) The image processing module 104 calculates an average distance between the point and its neighbor points.
3) For every point in the Deformed Generic Model, the image processing module 104 finds that point's neighbor points in the SLAM Scan.
4) Among its neighbor points in the SLAM Scan, the image processing module 104 finds the points that are located inside a cylinder region whose center is the Deformed Model point, whose axis is the Deformed Model point's normal, and whose radius is the average distance that was calculated in sub-step 2.
5) The image processing module 104 averages the points from the SLAM Scan inside each cylinder region.
6) The image processing module 104 moves each point in the Deformed Model to its averaged neighbor points in the Scan as determined in sub-step 5.

Figure 8A:
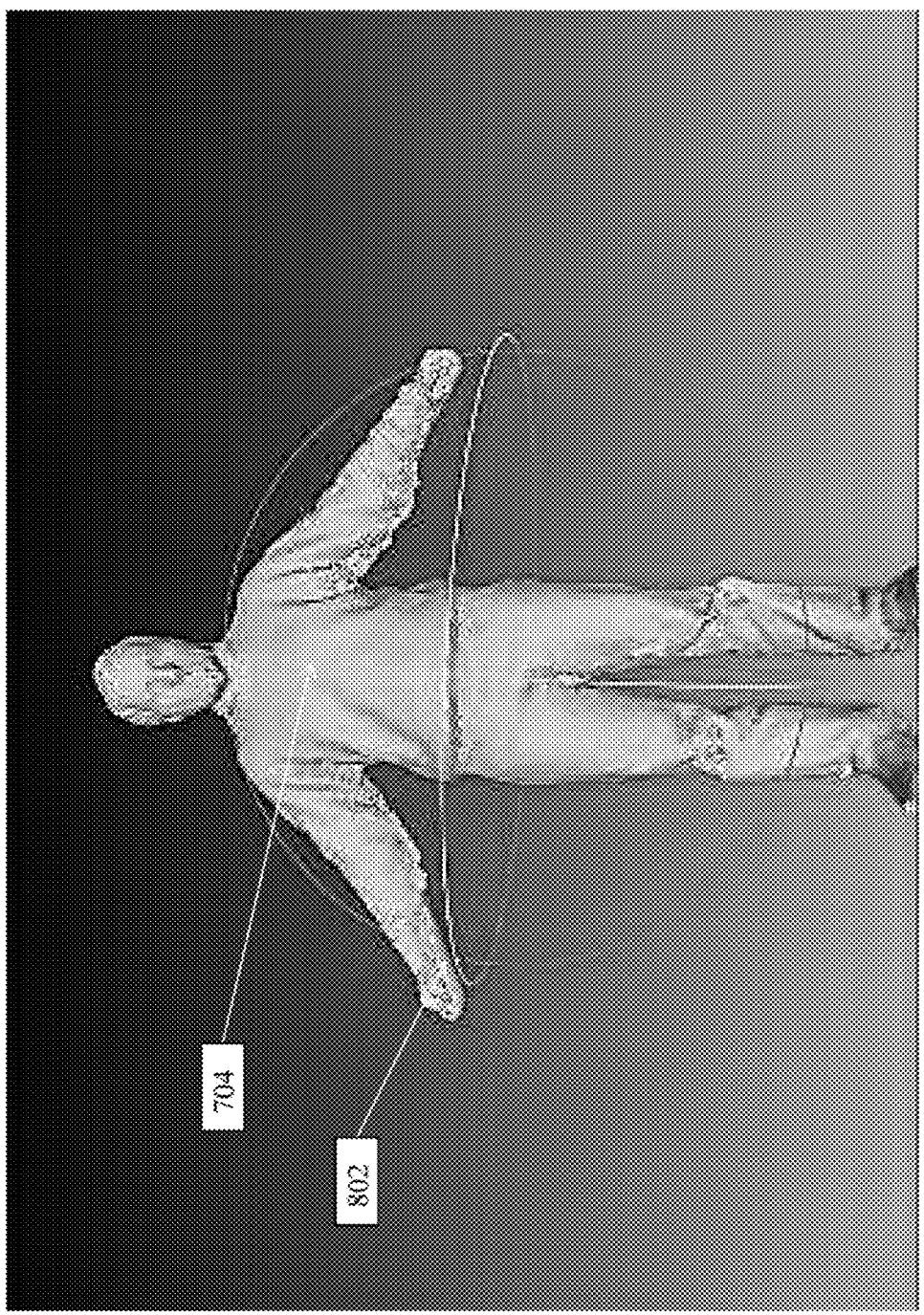
FIG. 8A shows a partially-matched Deformed Generic Model from a direct front-facing angle.
Figure 8B:
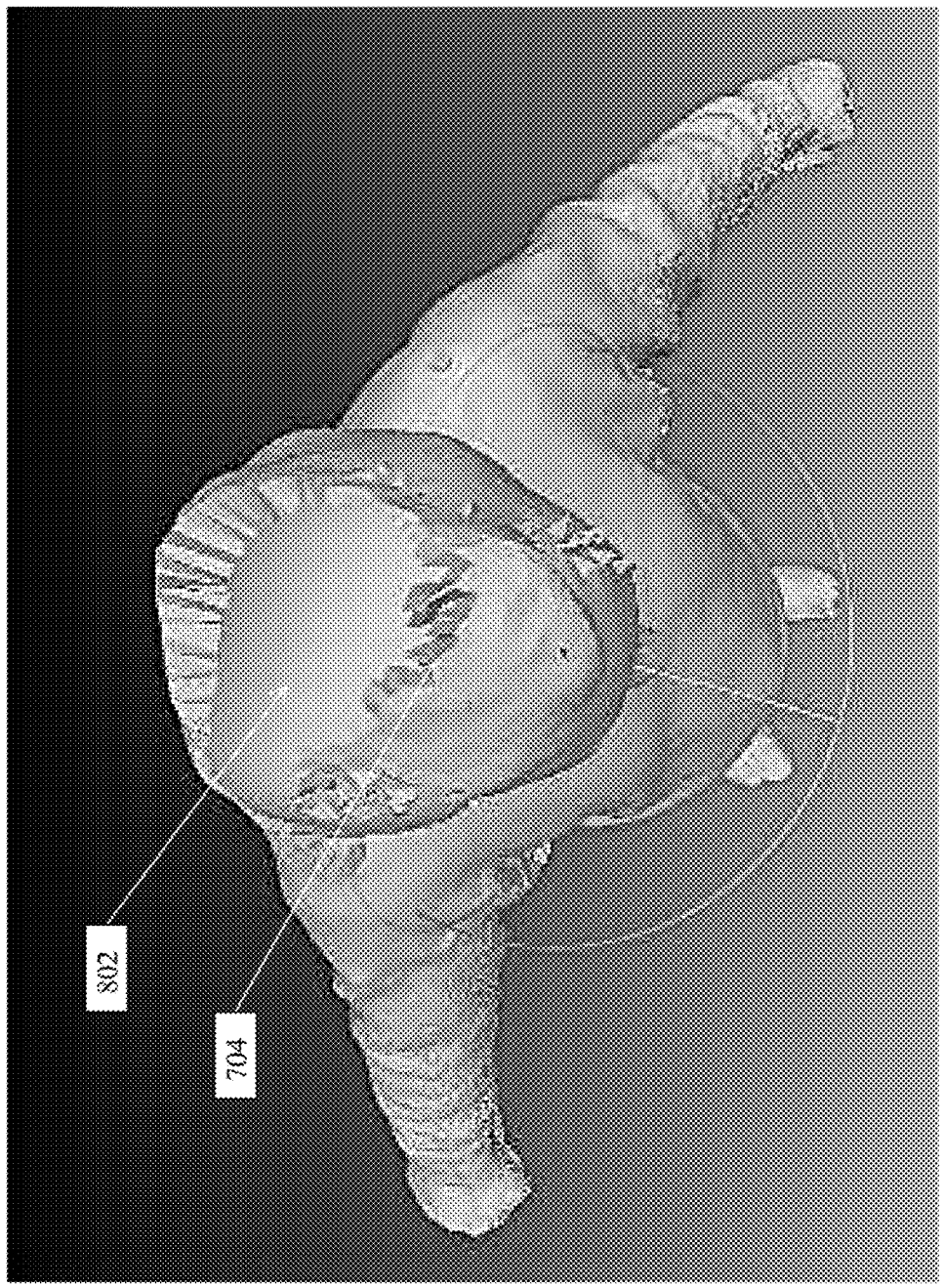
FIG. 8B shows a partially-matched Deformed Generic Model from a top-down angle.
Figure 8C:
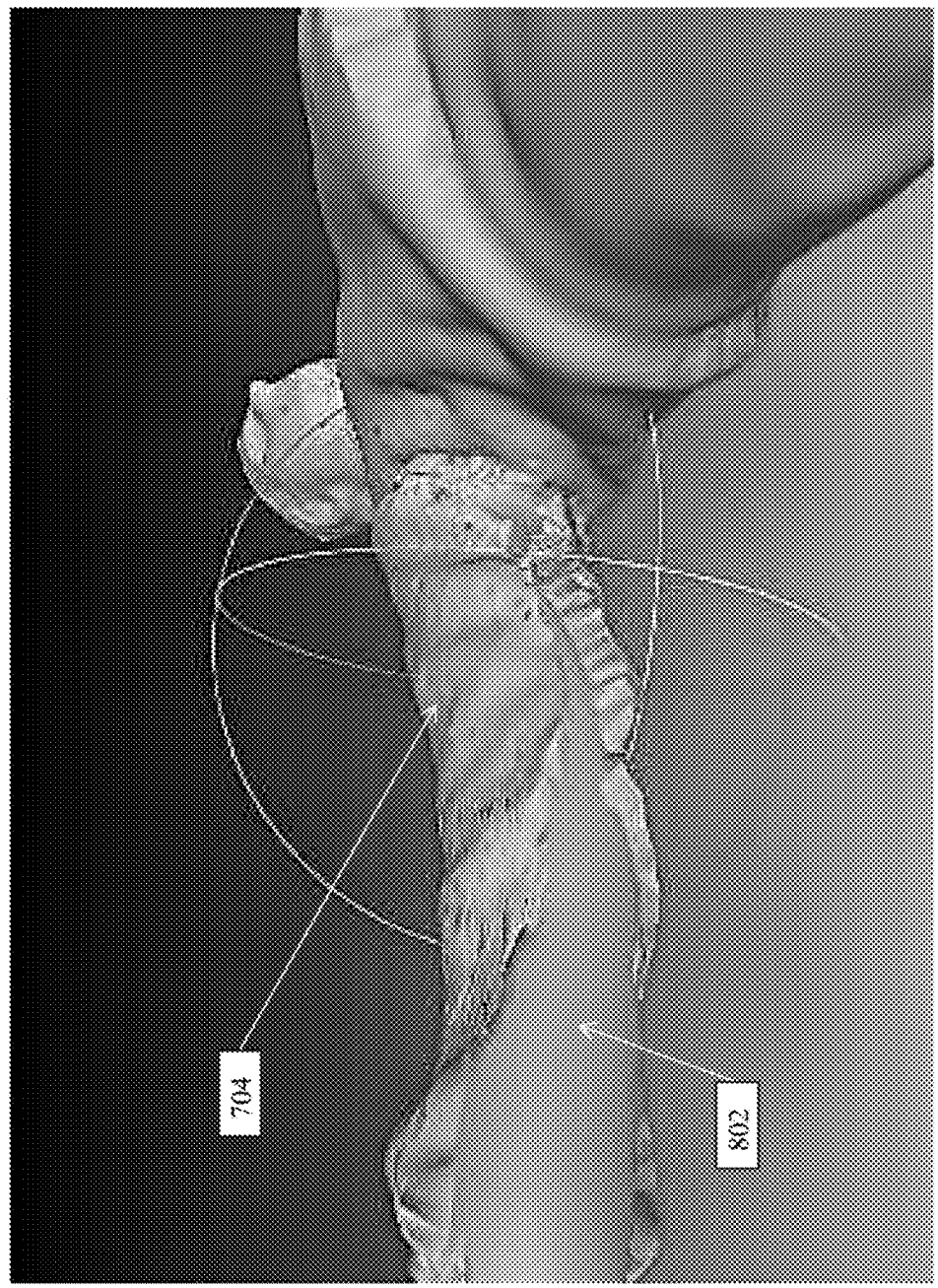
FIG. 8C shows a partially-matched Deformed Generic Model from a bottom, front-facing angle.

FIGS. 8A-8C shows the result of the matching step 206, specifically the Figures show the Deformed Generic Model 702 (e.g., that partially matches with the SLAM Scan) from different angles. FIG. 8A shows the partially-matched Deformed Generic Model 702 from a direct front-facing angle, FIG. 8B shows the partially-matched Deformed Generic Model 702 from a top-down angle, and FIG. 8C shows the partially-matched Deformed Generic Model 702 from a bottom, front-facing angle. As shown in FIGS. 8A-8C, the gaps 402 previously seen in the SLAM Scan 302 of FIGS. 4A-4C (e.g., under the arms, top of the head) are filled in by the matching process using the Deformed Generic Model (i.e., the smooth regions 802).

In some instances, certain objects when scanned may have large holes or gaps—resulting in significant distortions. The matching step 206 of the above-described method 200 can be refined to provide improved hole-filling and smoothing of large holes using an 'as rigid as possible' technique—set forth below with reference to method 900 of FIG. 9.

Figure 10A:
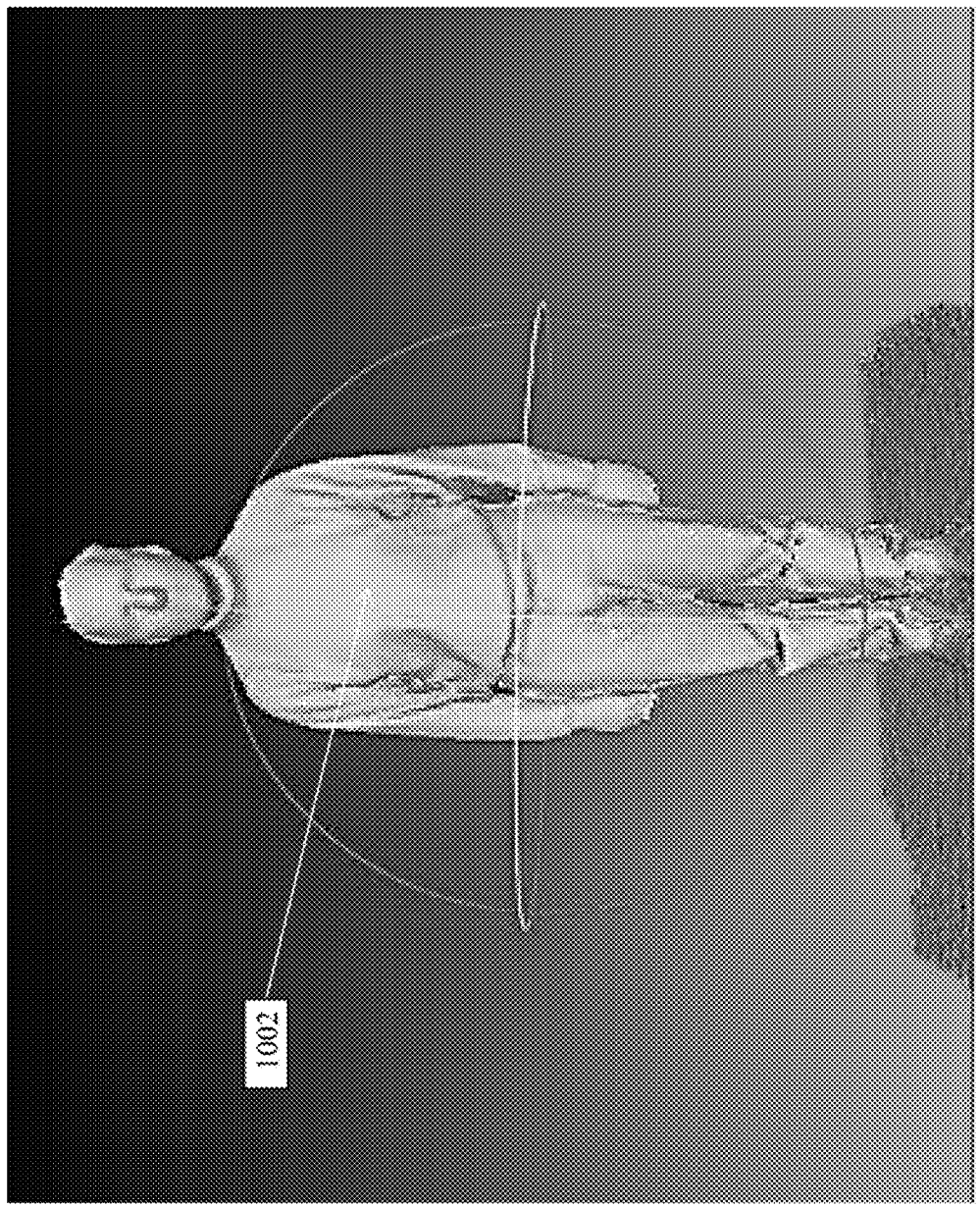
FIG. 10A shows a Generic Model.
Figure 10B:
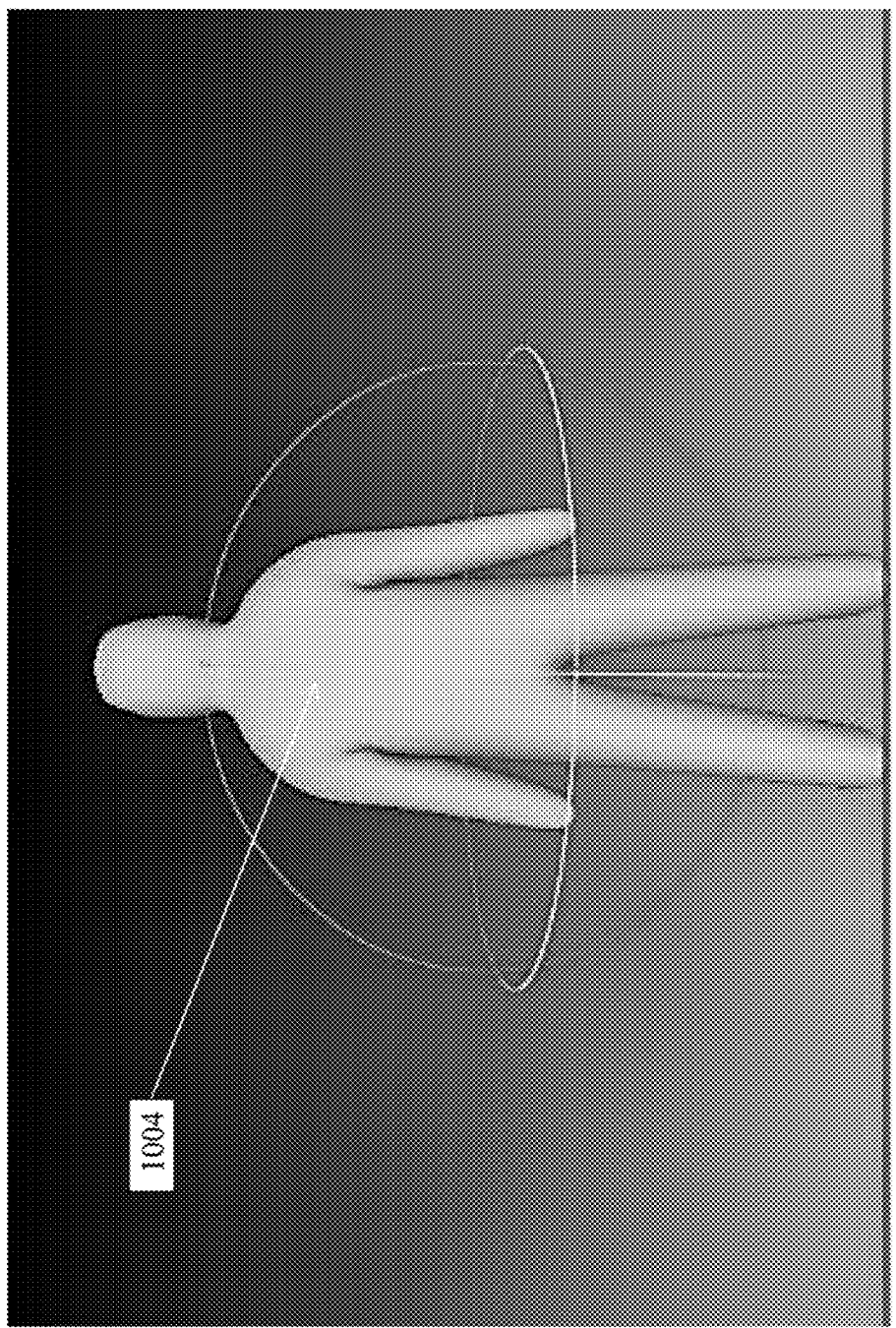
FIG. 10B shows a SLAM Scan from a front-facing angle.
Figure 10C:
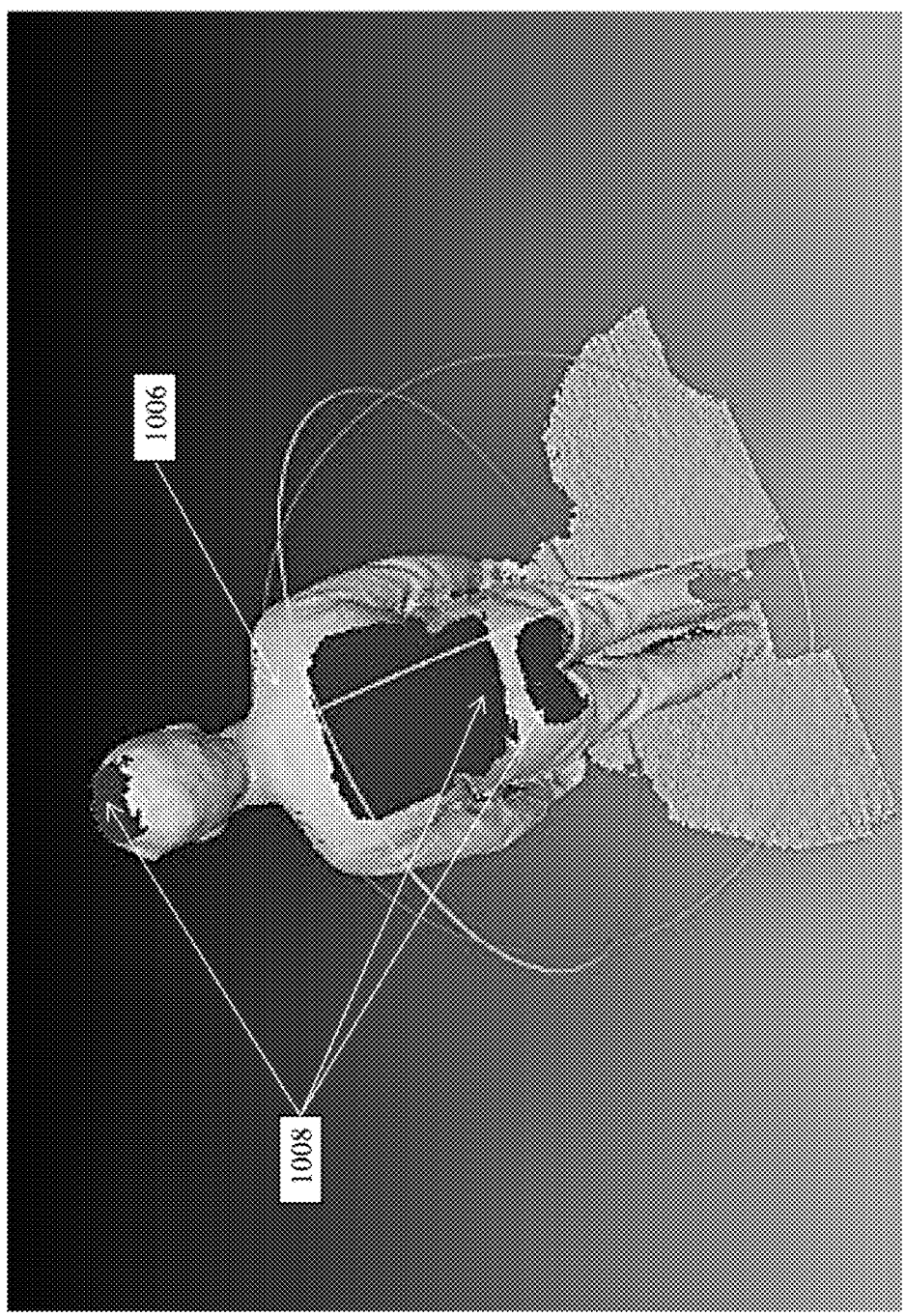
FIG. 10C shows a SLAM Scan from a rear-facing angle with several large holes.
Figure 11A:
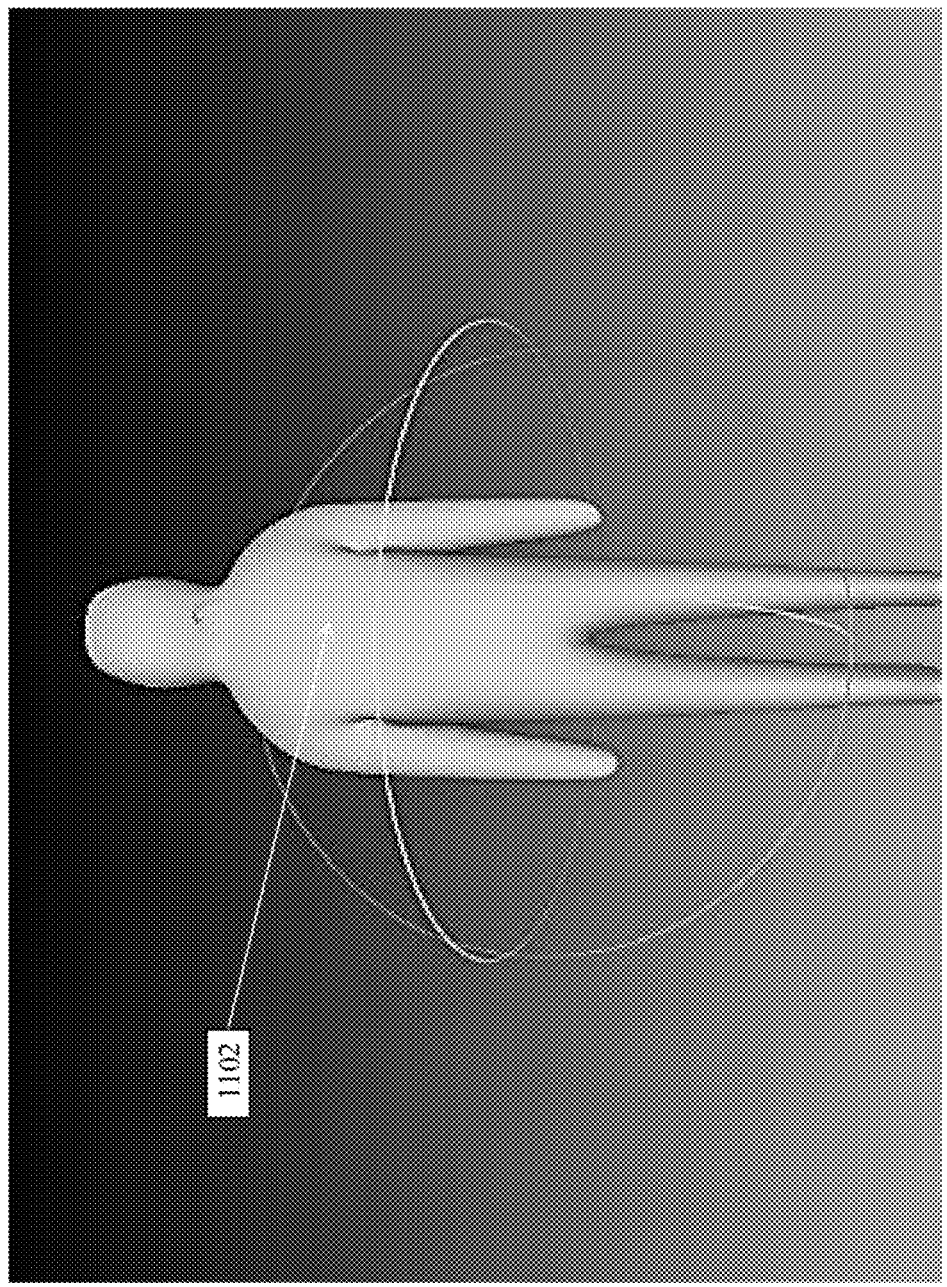
FIG. 11A shows a Deformed Generic Model.
Figure 11B:
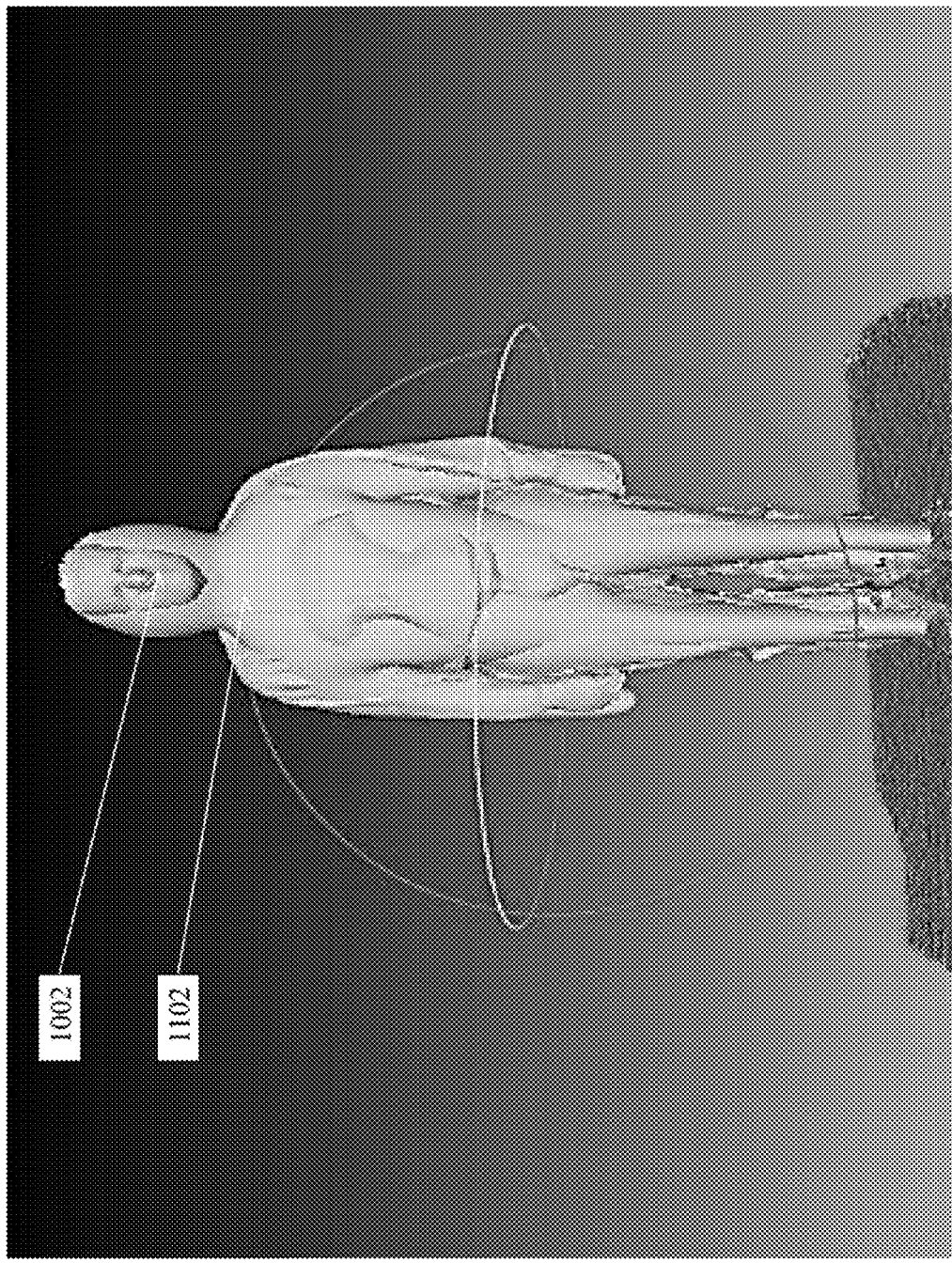
FIG. 11B shows a Deformed Generic Model matched with a SLAM Scan.

Beginning with the method 200 of FIG. 2, the image processing module 104 first receives as input the Generic Model 1002 (shown in FIG. 10A), the SLAM Scan 1004 from a front-facing angle (shown in FIG. 10B), the SLAM Scan 1006 from a rear-facing angle with several large holes 1008 (shown in FIG. 10C). As described previously, the image processing module 104 cleans (202) both the Generic Model 1002 and the SLAM Scan 1004 using the SLAM Camera Trace. The image processing module 104 then deforms (204) the cleaned Generic Model to the cleaned SLAM Scan 1004 based upon a non-rigid registration technique (as described above). FIG. 11A shows the Deformed Generic Model 1102, and FIG. 11B shows the Deformed Generic Model 1102 matched with the SLAM Scan 1004.

Figure 9:
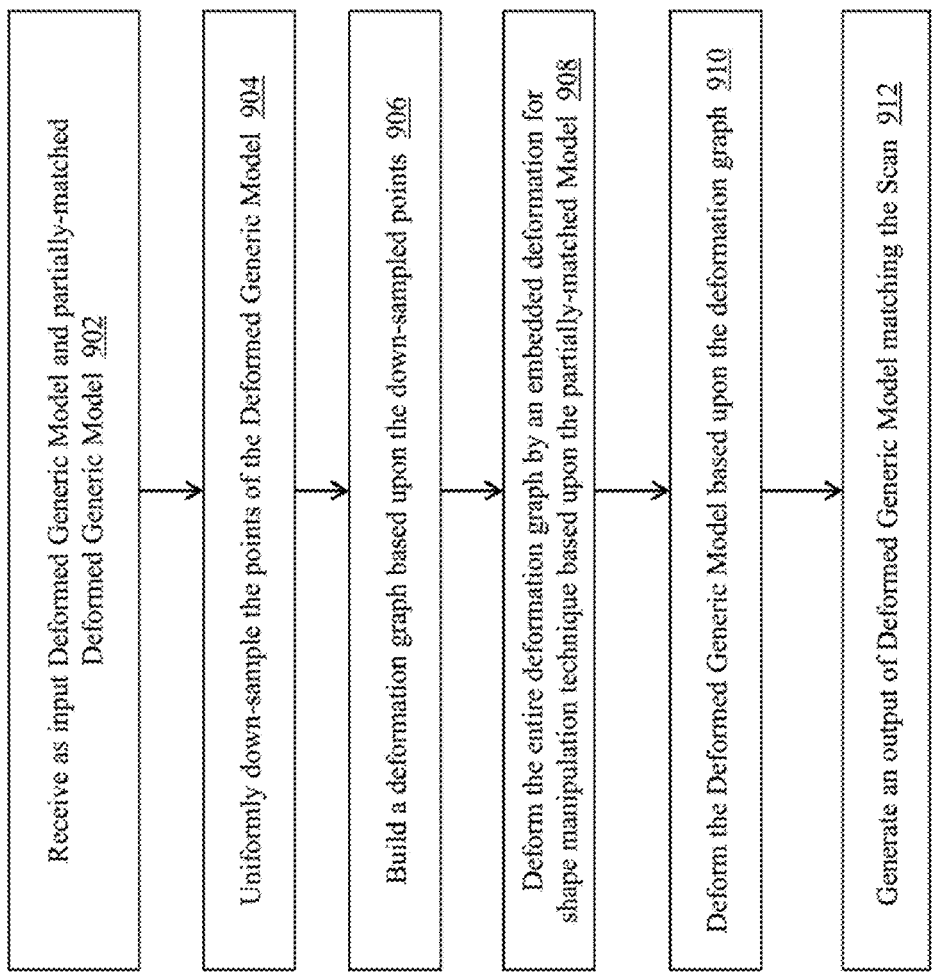
FIG. 9 is a flow diagram of a method for matching the Deformed Generic Model to the SLAM Scan in detail when there are large holes or gaps in the Scan.

The image processing module 104 matches (206) the Deformed Generic Model to the SLAM Scan in detail. FIG. 9 is a flow diagram of a method 900 for matching the Deformed Generic Model to the SLAM Scan in detail when there are large holes or gaps in the Scan. The image processing module 104 receives (902) as input the Deformed Generic Model and the partially-matched Deformed Generic Model, as described above. The image processing module 104 uniformly down-samples (904) the Deformed Generic Model, and builds (906) a deformation graph based upon the down-sampled points of the Deformed Generic Model.

The deformation graph comprises a list of deformation nodes. Each node has a 3D position, a list of neighbor deformation nodes, and a 3D affine matrix and a 3D translation vector for deformation. To build the deformation graph using the down-sampled points, the image processing module 104 represents each down-sampled point by a deformation node, and initializes the 3D position of the deformation node as the 3D position of the down-sampled point. The image processing module 104 searches the neighboring deformation nodes within a certain distance, and initializes the 3D affine matrix as an identity matrix and the translation vector as a zero vector.

The image processing module 104 then deforms (908) the entire deformation graph using an embedded deformation for shape manipulation technique based on the partially-matched Deformed Model. An exemplary embedded deformation for shape manipulation technique is described in Robert W. Sumner, et al., "Embedded Deformation for Shape Manipulation," Applied Geometry Group, ETH Zurich, SIGGRAPH 2007, which is incorporated herein by reference.

At this step in the method 900, some deformation nodes have matched points in the Scan and other deformation nodes do not have matched points. The deformation nodes that have matched points in the Scan deform to their matched points in the Scan. The remaining deformation nodes are deformed according to the deformation nodes that deform to their matched points in the Scan. In order to keep the smoothness and rigidness in the deformation result, the affine matrix of each deformation node is kept as rigid as possible, and the deformation influence of each deformation node to its neighbor nodes is kept as similar as possible to the deformation influence of its neighbor nodes to itself.

The image processing module 104 then deforms (910) the Deformed Generic Model based upon the deformation graph. For each point in the Deformed Generic Model, the image processing module 104 finds the neighbor deformation nodes in the deformation graph and deforms the point by the affine matrices and translation vectors of that point's neighbor deformation nodes. The image processing module 104 generates (912) an output of the Deformed Generic Model matching the Scan.

Figure 12A:
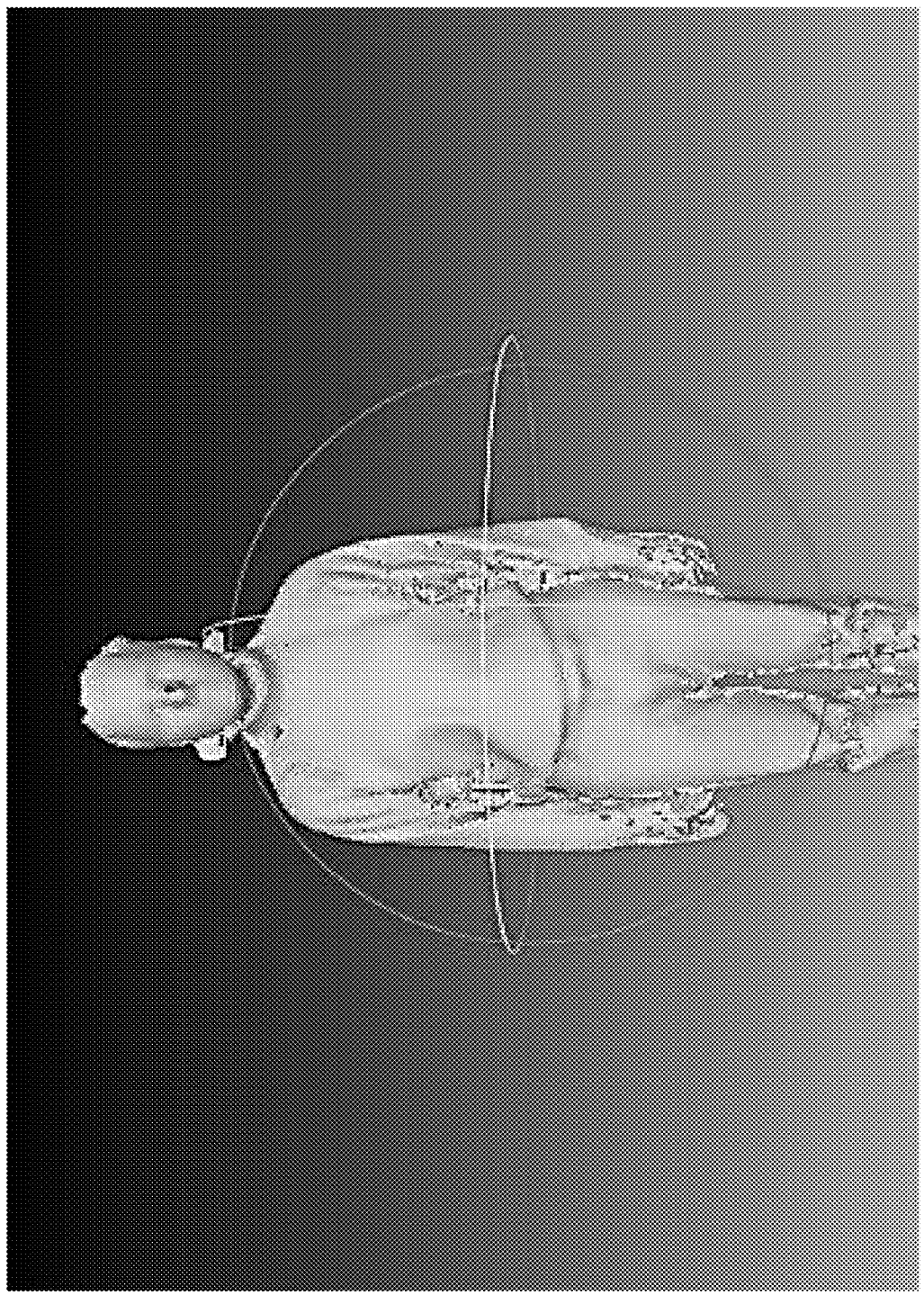
FIG. 12A shows a Deformed Generic Model as matched with a SLAM Scan from a front-facing angle.
Figure 12B:
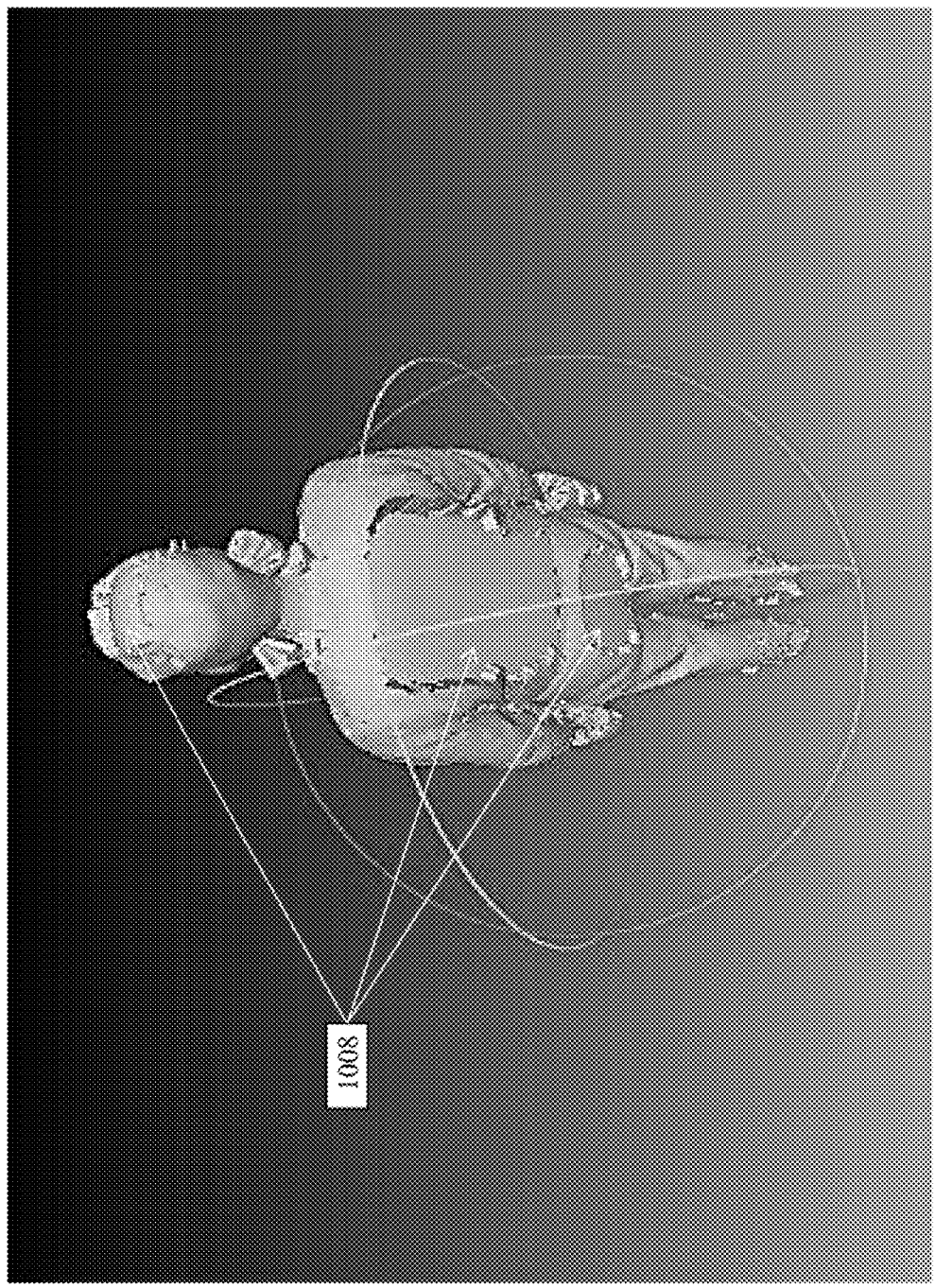
FIG. 12B shows a Deformed Generic Model as matched with a SLAM Scan from a rear-facing angle.

FIG. 12A shows the Deformed Generic Model as matched with the SLAM Scan from a front-facing angle after the image processing module 104 performs the processing described above with respect to FIG. 9. FIG. 12B shows the Deformed Generic Model as matched with the SLAM Scan from a rear-facing angle after the image processing module 104 performs the processing described above with respect to FIG. 9. As shown in FIG. 12B, the holes 1008 as previously seen in the SLAM Scan 1002 are filled in and smoothed.

Returning to FIG. 2, once the image processing module 104 completes the matching step 206, the module 104 deforms (208) the unmatched portion of the Deformed Generic Model based upon matched portion of the Deformed Generic Model. For the portion of the Deformed Generic Model in which matched points in the SLAM Scan are not found (i.e., the places where there are gaps or holes), the image processing module 104 predicts a refined deformation based on the neighbor Deformed Generic Model points for which the module 104 is able to find matches in the SLAM Scan, as provided in the following sub-steps:

1) For each unmatched point in the Deformed Generic Model, the image processing module 104 finds that point's neighbor points in the Deformed Generic Model for which are find matched points in the Scan, within a certain range.
2) Find other unmatched points in the same range and deform the unmatched points based on matched points (e.g., by using a Thin-Plate Spline algorithm).

Figure 13A:
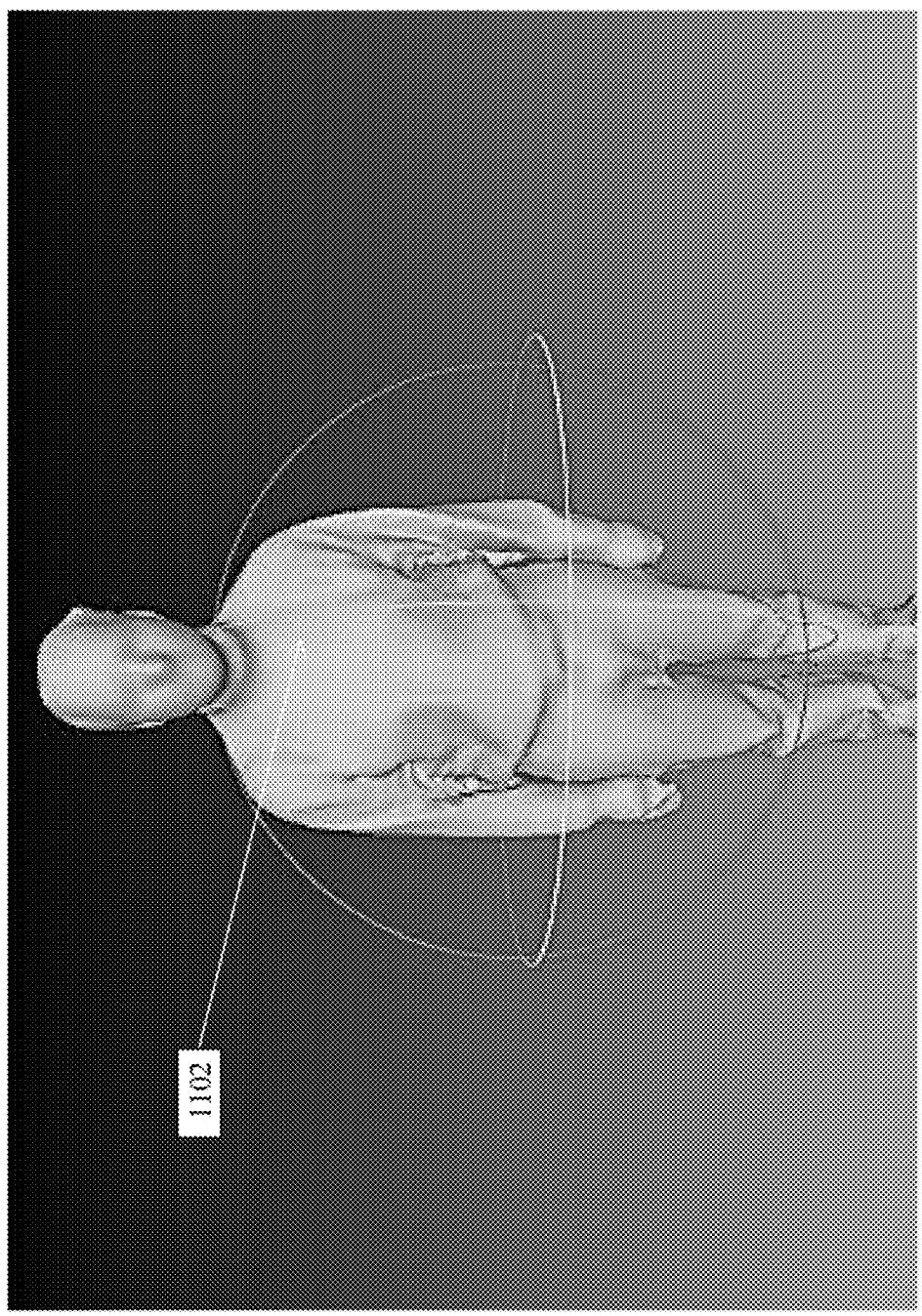
FIG. 13A shows a Deformed Generic Model as matched with SLAM Scan from a front-facing angle.
Figure 13B:
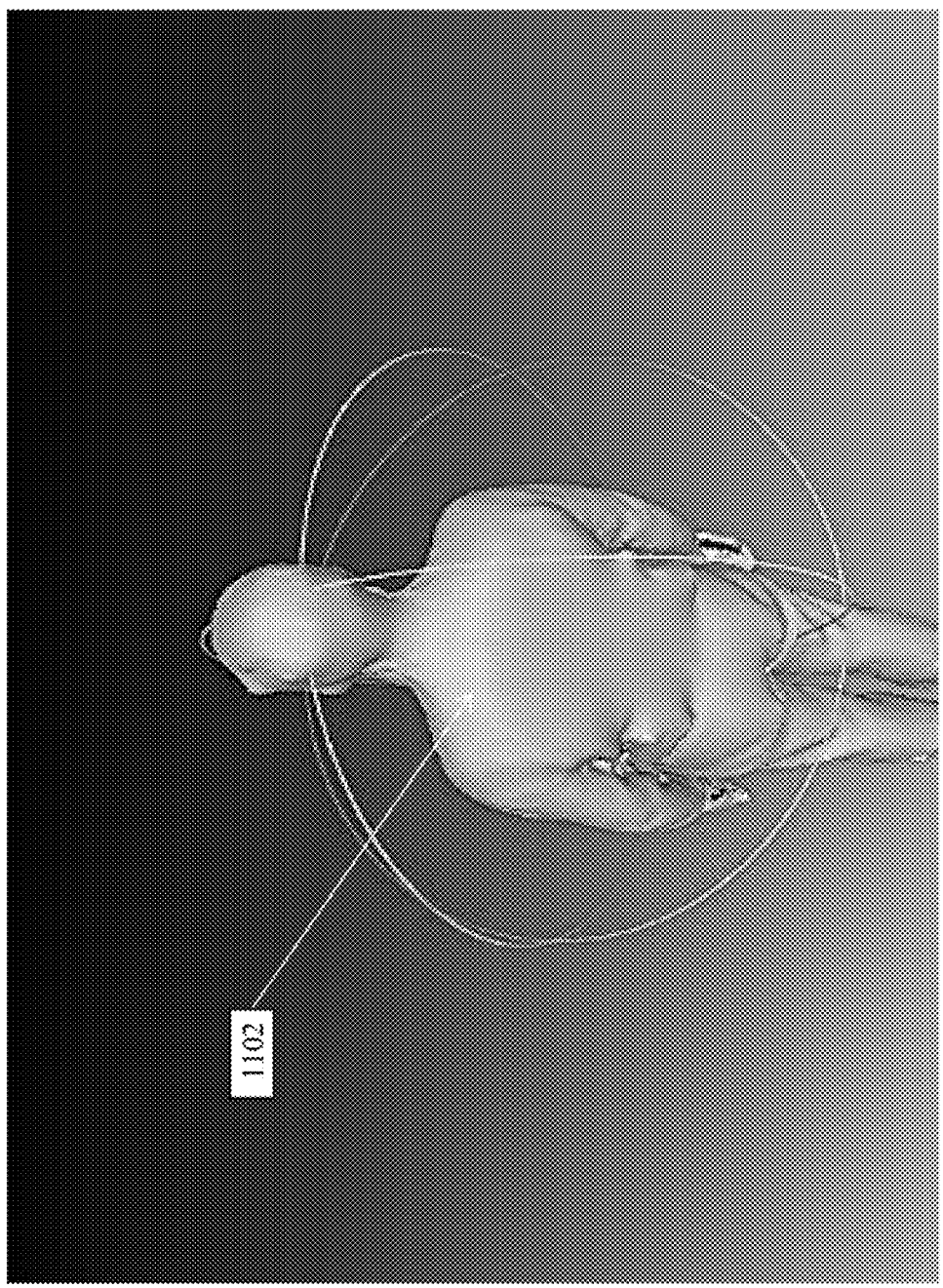
FIG. 13B shows a Deformed Generic Model as matched with a SLAM Scan from a rear-facing angle.

As an example, FIG. 13A shows the Deformed Generic Model 1102 as matched with the SLAM Scan from a front-facing angle after the image processing module 104 performs the deforming (208) step of FIG. 2, and FIG. 13B shows the Deformed Generic Model 1102 as matched with the SLAM Scan from a rear-facing angle after the image processing module 104 performs the deforming (208) step of FIG. 2.

Returning to FIG. 1, once Step 4 is complete, the computing device determines that the Deformed Generic Model matches the SLAM Scan and performs an output step to provide the Deformed Generic Model, e.g., to other image processing devices and/or applications, as described below.

3D Printing

In the 3D printing industry, there is a need to scan particular objects in the real world to be 3D printed. Typically, the scene that contains the target object to be printed is captured and the target object is cropped out manually using a CAD system. The object is further refined so that only the scan points of the object remain. The object is then converted into a 3D model.

The methods and systems for shape-based registration for complex objects as described herein automatically detect the object even in a noisy environment. In addition, the methods and systems enable the detection of the object's pose—making it easy to extract the object scan points from the scene and, just as importantly, associate which points in the object belong to which area of the object. As a result, subsequent 3D reconstruction processes are simpler because many points are already associated with a position within the 3D model.

Parts Inspection

In a manufacturing environment, parts are typically either individually separated or positioned in a known position for inspection. These requirements can add cost and complexity to the machines used for parts inspection as well as the process for inspecting parts.

The methods and systems for shape-based registration for complex objects as described herein automatically detect a part, and the part's features can now be compared against a reference model to identify any defects.

Other Applications

Industries such as medical, security, agriculture, and others can also take advantage of the methods and systems for shape-based Registration for complex objects described herein to simply object recognition processes.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the technology may be embodied in other specific forms without departing from the spirit or essential characteristics thereof. The foregoing embodiments are therefore to be considered in all respects illustrative rather than limiting of the technology described herein.

The invention claimed is:

1. A computerized method for closed-form 3D model generation of non-rigid complex objects from incomplete and noisy scans, the method comprising:
   receiving, by an image processing module of a computing device, a scan of a non-rigid complex object captured by a sensor coupled to the computing device, a 3D model corresponding to the object, and a camera trace, wherein the scan includes one or more holes;
   cleaning, by the image processing module, the scan and the 3D model using the camera trace;
   deforming, by the image processing module, the cleaned 3D model to the cleaned scan;
   matching, by the image processing module, the deformed 3D model to the cleaned scan;
   determining, by the image processing module, one or more portions of the deformed 3D model that are unmatched; and
   deforming, by the image processing module, the unmatched portions of the deformed 3D model to the scan using the matched portions of the deformed 3D model to generate a closed-form 3D model that closes the holes in the scan.

2. The method of claim 1, wherein the step of cleaning the scan and the 3D model comprises
   projecting, by the image processing module, one of the 3D model or the scan to a rough camera plane at a plurality of angles;
   recording, by the image processing module, points in 3D model or the scan with a smallest depth value at each of the plurality of angles; and
   projecting, by the image processing module, the 3D model or the scan to the rough camera plane.

3. The method of claim 1, wherein the step of matching the deformed 3D model and the scan comprises
   deforming, by the image processing module, the cleaned 3D model to at least partially match the cleaned scan by creating holes in the cleaned 3D model that are similar to the holes in the cleaned scan; and
   deforming, by the image processing module, the holes in the cleaned 3D model based upon the deforming the cleaned 3D model step.

4. The method of claim 3, wherein the step of deforming the cleaned 3D model is performed using a coherent point drifting algorithm.

5. The method of claim 3, wherein the step of deforming the holes in the cleaned 3D model is performed using a thin-plate spline algorithm.

6. The method of claim 3, wherein the cleaned 3D model and the cleaned scan are down-sampled before deforming the cleaned 3D model.

7. The method of claim 1, wherein the step of matching the deformed 3D model to the scan comprises
   finding, by the image processing module, one or more neighbor points in the deformed 3D model for each point in the deformed 3D model;
   calculating, by the image processing module, an average distance between each point and the corresponding neighbor points;
   finding, by the image processing module, one or more neighbor points in the cleaned scan for each point in the deformed 3D model;
   finding, by the image processing module, one or more of the neighbor points that are located inside a cylinder region whose center is the point in the deformed 3D model, whose axis is a normal of the point in the deformed 3D model, and whose radius is the average distance;
   averaging, by the image processing module, the one or more of the neighbor points located inside the cylinder region; and
   moving, by the image processing module, each point in the deformed 3D model to the averaged neighbor points.

8. The method of claim 1, wherein the step of deforming the unmatched portions of the deformed 3D model to the scan using the matched portions of the deformed 3D model comprises
   finding, by the image processing module for each unmatched point in the deformed 3D model, one or more neighbor points in the deformed 3D model for which there are matched points in the scan within a predetermined range;
   finding, by the image processing module, one or more other unmatched points within the predetermined range; and
   deforming, by the image processing module, the one or more other unmatched points based upon the matched points.

9. The method of claim 8, wherein the unmatched points are deformed using a thin-plate spline algorithm.

10. The method of claim 1, wherein the step of matching the deformed 3D model to the cleaned scan further comprises
    uniformly down-sampling, by the image processing module, points of the deformed 3D model;
    building, by the image processing module, a deformation graph based upon the down-sampled points, wherein the deformation graph comprises a list of deformation nodes having a 3D position, a list of neighbor deformation nodes, and a 3D affine matrix and a 3D translation vector for deformation;
    deforming, by the image processing module, the deformation graph using an embedded deformation for shape manipulation technique; and
    deforming, by the image processing module, the deformed 3D model based upon the deformation graph.

11. The method of claim 10, wherein the step of building a deformation graph comprises
    representing, by the image processing module, each down-sampled point by a deformation node;
    initializing, by the image processing module, the 3D position of the deformation node as a 3D position of the down-sampled point;
    searching, by the image processing module, neighboring deformation nodes within a predetermined distance; and
    initializing, by the image processing module, the 3D affine matrix of as an identity matrix and the translation vector as a zero vector.

12. A system for closed-form 3D model generation of non-rigid complex objects from incomplete and noisy scans, the system comprising an image processing module of a computing device configured to:
  receive a scan of a non-rigid complex object captured by a sensor coupled to the computing device, a 3D model corresponding to the object, and a camera trace, wherein the scan includes one or more holes;
  clean the scan and the 3D model using the camera trace;
  deform the cleaned 3D model to the cleaned scan;
  match the deformed 3D model to the cleaned scan;
  determine one or more portions of the deformed 3D model that are unmatched; and
  deform the unmatched portions of the deformed 3D model to the scan using the matched portions of the deformed 3D model to generate a closed-form 3D model that closes the holes in the scan.

13. The system of claim 12, wherein for the step of cleaning the scan and the 3D model the image processing module is configured to
  project one of the 3D model or the scan to a rough camera plane at a plurality of angles;
  record points in 3D model or the scan with a smallest depth value at each of the plurality of angles; and
  project the 3D model or the scan to the rough camera plane.

14. The system of claim 12, wherein for the step of matching the deformed 3D model and the scan the image processing module is configured to
  deform the cleaned 3D model to at least partially match the cleaned scan by creating holes in the cleaned 3D model that are similar to the holes in the cleaned scan; and
  deform the holes in the cleaned 3D model based upon the deforming the cleaned 3D model step.

15. The system of claim 14, wherein the image processing module uses a coherent point drifting algorithm when performing the step of deforming the cleaned 3D model.

16. The system of claim 14, wherein the image processing module uses a thin-plate spline algorithm when performing the step of deforming the holes in the cleaned 3D model.

17. The system of claim 14, wherein the cleaned 3D model and the cleaned scan are down-sampled before deforming the cleaned 3D model.

18. The system of claim 12, wherein for the step of matching the deformed 3D model to the scan the image processing module is configured to
  find one or more neighbor points in the deformed 3D model for each point in the deformed 3D model;
  calculate an average distance between each point and the corresponding neighbor points;
  find one or more neighbor points in the cleaned scan for each point in the deformed 3D model;
  find one or more of the neighbor points that are located inside a cylinder region whose center is the point in the deformed 3D model, whose axis is a normal of the point in the deformed 3D model, and whose radius is the average distance;
  average the one or more of the neighbor points located inside the cylinder region; and
  move each point in the deformed 3D model to the averaged neighbor points.

19. The system of claim 12, wherein for the step of deforming the unmatched portions of the deformed 3D model to the scan using the matched portions of the deformed 3D model the image processing module is configured to
  Find, for each unmatched point in the deformed 3D model, one or more neighbor points in the deformed 3D model for which there are matched points in the scan within a predetermined range;
  find one or more other unmatched points within the predetermined range; and
  deform the one or more other unmatched points based upon the matched points.

20. The system of claim 19, wherein the unmatched points are deformed using a thin-plate spline algorithm.

21. The system of claim 12, wherein for the step of matching the deformed 3D model to the cleaned scan the image processing module is further configured to
  uniformly down-sample points of the deformed 3D model;
  build a deformation graph based upon the down-sampled points, wherein the deformation graph comprises a list of deformation nodes having a 3D position, a list of neighbor deformation nodes, and a 3D affine matrix and a 3D translation vector for deformation;
  deform the deformation graph using an embedded deformation for shape manipulation technique; and
  deform the deformed 3D model based upon the deformation graph.

22. The system of claim 21, wherein for the step of building a deformation graph the image processing module is configured to
  represent each down-sampled point by a deformation node;
  initialize the 3D position of the deformation node as a 3D position of the down-sampled point;
  search neighboring deformation nodes within a predetermined distance; and
  initialize the 3D affine matrix of as an identity matrix and the translation vector as a zero vector.

23. A computer program product, tangibly embodied in a non-transitory computer readable storage medium, for closed-form 3D model generation of non-rigid complex objects from incomplete and noisy scans, the computer program product including instructions operable to cause an image processing module of a computing device to:
  receive a scan of a non-rigid complex object captured by a sensor coupled to the computing device, a 3D model corresponding to the object, and a camera trace, wherein the scan includes one or more holes;
  clean the scan and the 3D model using the camera trace;
  deform the cleaned 3D model to the cleaned scan;
  match the deformed 3D model to the cleaned scan;
  determine one or more portions of the deformed 3D model that are unmatched; and
  deform the unmatched portions of the deformed 3D model to the scan using the matched portions of the deformed 3D model to generate a closed-form 3D model that closes the holes in the scan.

* * * * *